United States Patent
Chen et al.

(10) Patent No.: US 9,456,015 B2
(45) Date of Patent: Sep. 27, 2016

(54) REPRESENTATION GROUPS FOR NETWORK STREAMING OF CODED MULTIMEDIA DATA

(75) Inventors: Ying Chen, San Diego, CA (US); Thomas Stockhammer, Bergen (DE); Mark Watson, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 803 days.

(21) Appl. No.: 13/205,559

(22) Filed: Aug. 8, 2011

(65) Prior Publication Data

US 2012/0042050 A1 Feb. 16, 2012

Related U.S. Application Data

(60) Provisional application No. 61/372,399, filed on Aug. 10, 2010.

(51) Int. Cl.
H04L 29/06 (2006.01)

(52) U.S. Cl.
CPC ........... *H04L 65/604* (2013.01); *H04L 65/607* (2013.01); *H04L 65/4084* (2013.01); *H04L 65/602* (2013.01); *H04L 65/80* (2013.01)

(58) Field of Classification Search
CPC .................................................. H04L 65/4084
USPC .................................................. 709/218, 219
See application file for complete search history.

(56) References Cited

U.S. PATENT DOCUMENTS

| | | |
|---|---|---|
| 3,909,721 A | 9/1975 | Bussgang et al. |
| 4,365,338 A | 12/1982 | McRae et al. |
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,329,369 A | 7/1994 | Willis et al. |
| 5,331,320 A | 7/1994 | Cideciyan et al. |

(Continued)

FOREIGN PATENT DOCUMENTS

| | | |
|---|---|---|
| CN | 1338839 A | 3/2002 |
| CN | 1481643 A | 3/2004 |

(Continued)

OTHER PUBLICATIONS

Office Action from Japanese Application No. 2013-525181, dated Jan. 14, 2014, 5 pp.

(Continued)

*Primary Examiner* — Adnan Mirza

(74) *Attorney, Agent, or Firm* — Shumaker & Sieffert, P.A.

(57) ABSTRACT

In one example, a device for receiving information for multimedia data, the device comprising one or more processors configured to analyze at least a portion of a manifest file for multimedia content, wherein the portion of the manifest file includes information indicative of sets of representations of the multimedia content and information indicative of common characteristics for each of the sets of representations, select one of the sets of representations based on the common characteristics for the one of the sets of representations, select one of the representations of the selected one of the sets of representations based on one or more coding characteristics of the one of the representations of the one of the sets, and generate a request for data of the one of the representations based on the selection.

38 Claims, 11 Drawing Sheets

(56) References Cited

U.S. PATENT DOCUMENTS

| | | |
|---|---|---|
| 5,371,532 A | 12/1994 | Gelman et al. |
| 5,372,532 A | 12/1994 | Robertson |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey |
| 5,699,473 A | 12/1997 | Kim |
| 5,701,582 A | 12/1997 | Debey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,798,791 B1 | 9/2004 | Riazi et al. |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | Desjardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,113,773 B2 | 9/2006 | Quick, Jr. et al. |
| 7,139,660 B2 | 11/2006 | Sarkar et al. |
| 7,139,960 B2 | 11/2006 | Shokrollahi |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 * | 1/2007 | Poltorak ............... 455/3.06 |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |

(56) References Cited

U.S. PATENT DOCUMENTS

| | | |
|---|---|---|
| 7,240,236 B2 | 7/2007 | Cutts et al. |
| 7,240,358 B2 | 7/2007 | Horn et al. |
| 7,243,285 B2 | 7/2007 | Foisy et al. |
| 7,254,754 B2 | 8/2007 | Hetzler et al. |
| 7,257,764 B2 | 8/2007 | Suzuki et al. |
| 7,289,506 B1 | 10/2007 | Hannuksela |
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,398,454 B2 | 7/2008 | Cai et al. |
| 7,406,010 B2 | 7/2008 | Hyen |
| 7,409,626 B1 | 8/2008 | Schelstraete |
| 7,412,641 B2 | 8/2008 | Shokrollahi |
| 7,418,651 B2 | 8/2008 | Luby et al. |
| 7,447,791 B2 | 11/2008 | Leaning et al. |
| 7,483,447 B2 | 1/2009 | Chang et al. |
| 7,483,489 B2 | 1/2009 | Gentric et al. |
| 7,492,828 B2 | 2/2009 | Keerthi |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,720,096 B2 | 5/2010 | Klemets |
| 7,721,184 B2 | 5/2010 | Luby et al. |
| 7,805,456 B2 | 9/2010 | Meijer et al. |
| 7,813,822 B1 | 10/2010 | Hoffberg |
| 7,831,896 B2 | 11/2010 | Amram et al. |
| 7,895,629 B1 | 2/2011 | Shen et al. |
| 7,924,913 B2 | 4/2011 | Sullivan et al. |
| 7,961,700 B2 | 6/2011 | Malladi et al. |
| 7,979,769 B2 | 7/2011 | Chun et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,775,174 B2 | 7/2014 | Conejero et al. |
| 8,812,735 B2 | 8/2014 | Igarashi |
| 8,874,436 B2 | 10/2014 | Goldhor |
| 8,958,375 B2 | 2/2015 | Watson et al. |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0023246 A1 | 2/2002 | Jin |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0009579 A1 | 1/2003 | Kawai et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2003/0226089 A1 | 12/2003 | Rasmussen et al. |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0066854 A1 | 4/2004 | Hannuksela |
| 2004/0081106 A1 | 4/2004 | Bruhn |
| 2004/0083015 A1 | 4/2004 | Patwari |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0231004 A1 | 11/2004 | Seo |
| 2004/0240382 A1 | 12/2004 | Ido et al. |
| 2004/0255328 A1 | 12/2004 | Baldwin et al. |
| 2005/0004997 A1 | 1/2005 | Balcisoy et al. |
| 2005/0028067 A1 | 2/2005 | Weirauch |
| 2005/0041736 A1 | 2/2005 | Butler-Smith et al. |
| 2005/0071491 A1 | 3/2005 | Seo |
| 2005/0091697 A1 | 4/2005 | Tanaka et al. |
| 2005/0097213 A1 | 5/2005 | Barrett et al. |
| 2005/0102371 A1 | 5/2005 | Aksu |
| 2005/0105371 A1 | 5/2005 | Johnson et al. |
| 2005/0123058 A1 | 6/2005 | Greenbaum et al. |
| 2005/0138286 A1 | 6/2005 | Franklin et al. |
| 2005/0160272 A1 | 7/2005 | Teppler |
| 2005/0160347 A1 | 7/2005 | Kim et al. |
| 2005/0163468 A1 | 7/2005 | Takahashi et al. |
| 2005/0169379 A1 | 8/2005 | Shin et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0195899 A1 | 9/2005 | Han |
| 2005/0195900 A1 | 9/2005 | Han |
| 2005/0207392 A1 | 9/2005 | Sivalingham et al. |
| 2005/0216472 A1 | 9/2005 | Leon et al. |
| 2005/0216951 A1 | 9/2005 | MacInnis |
| 2005/0254526 A1 | 11/2005 | Wang et al. |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0034308 A1 | 2/2006 | Kanaya et al. |
| 2006/0037057 A1 | 2/2006 | Xu |
| 2006/0045180 A1 | 3/2006 | Ghanbari et al. |
| 2006/0087456 A1 | 4/2006 | Luby |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0193524 A1 | 8/2006 | Tarumoto et al. |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0262856 A1 | 11/2006 | Wu et al. |
| 2006/0279437 A1 | 12/2006 | Luby et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |

(56) References Cited

U.S. PATENT DOCUMENTS

| | | |
|---|---|---|
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0081586 A1 | 4/2007 | Raveendran et al. |
| 2007/0110074 A1 | 5/2007 | Bradley et al. |
| 2007/0127576 A1 | 6/2007 | Henocq et al. |
| 2007/0134005 A1 | 6/2007 | Myong et al. |
| 2007/0140369 A1 | 6/2007 | Limberg et al. |
| 2007/0157267 A1 | 7/2007 | Lopez-Estrada |
| 2007/0162568 A1 | 7/2007 | Gupta et al. |
| 2007/0162611 A1 | 7/2007 | Yu et al. |
| 2007/0177811 A1 | 8/2007 | Yang |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | Orourke et al. |
| 2007/0255844 A1 | 11/2007 | Shen et al. |
| 2007/0277209 A1 | 11/2007 | Yousef |
| 2007/0300127 A1 | 12/2007 | Watson et al. |
| 2008/0010153 A1 | 1/2008 | Pugh-O'Connor et al. |
| 2008/0052753 A1 | 2/2008 | Huang et al. |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0152241 A1 | 6/2008 | Itoi et al. |
| 2008/0168133 A1 | 7/2008 | Osborne |
| 2008/0168516 A1 | 7/2008 | Flick et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | Dipietro et al. |
| 2008/0215317 A1 | 9/2008 | Fejzo |
| 2008/0222302 A1 | 9/2008 | Nguyen et al. |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0303896 A1 | 12/2008 | Lipton et al. |
| 2008/0309525 A1 | 12/2008 | Shokrollahi et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0164653 A1 | 6/2009 | Mandyam et al. |
| 2009/0195640 A1 | 8/2009 | Kim et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0080290 A1 | 4/2010 | Mehrotra |
| 2010/0131671 A1 | 5/2010 | Kohli et al. |
| 2010/0153578 A1 | 6/2010 | Van Gassel et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0235472 A1 | 9/2010 | Sood et al. |
| 2010/0235528 A1 | 9/2010 | Bocharov et al. |
| 2010/0257051 A1* | 10/2010 | Fernandez Gutierrez . 705/14.43 |
| 2010/0318632 A1 | 12/2010 | Yoo et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0119394 A1 | 5/2011 | Wang et al. |
| 2011/0119396 A1 | 5/2011 | Kwon et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0268178 A1 | 11/2011 | Park et al. |
| 2011/0307545 A1 | 12/2011 | Bouazizi |
| 2011/0307581 A1 | 12/2011 | Furbeck et al. |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0047280 A1 | 2/2012 | Park et al. |
| 2012/0099593 A1 | 4/2012 | Luby |
| 2012/0151302 A1 | 6/2012 | Luby et al. |
| 2012/0166499 A1 | 6/2012 | Anderson et al. |
| 2012/0185530 A1 | 7/2012 | Reza |
| 2012/0202535 A1 | 8/2012 | Chaddha et al. |
| 2012/0297410 A1 | 11/2012 | Lohmar et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |
| 2014/0380113 A1 | 12/2014 | Luby |
| 2015/0039782 A1 | 2/2015 | Major |
| 2016/0065640 A1 | 3/2016 | Luby et al. |

FOREIGN PATENT DOCUMENTS

| | | |
|---|---|---|
| CN | 1708934 A | 12/2005 |
| CN | 1714577 A | 12/2005 |
| CN | 1792056 A | 6/2006 |
| CN | 1806392 A | 7/2006 |
| CN | 1819661 A | 8/2006 |
| CN | 1902865 A | 1/2007 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1024672 A1 | 8/2000 |

(56) References Cited

FOREIGN PATENT DOCUMENTS

| | | |
|---|---|---|
| EP | 1051027 A1 | 11/2000 |
| EP | 1124344 A1 | 8/2001 |
| EP | 1241795 A2 | 9/2002 |
| EP | 1298931 A2 | 4/2003 |
| EP | 1406452 A2 | 4/2004 |
| EP | 1455504 A2 | 9/2004 |
| EP | 1468497 A1 | 10/2004 |
| EP | 1501318 A1 | 1/2005 |
| EP | 1670256 A2 | 6/2006 |
| EP | 2046044 A1 | 4/2009 |
| EP | 2071827 A2 | 6/2009 |
| EP | 2096870 A2 | 9/2009 |
| EP | 1700410 B1 | 4/2010 |
| EP | 2323390 A2 | 5/2011 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001189665 A | 7/2001 |
| JP | 2001223655 A | 8/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003018568 A | 1/2003 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 200319012 A | 11/2003 |
| JP | 2003318975 A | 11/2003 |
| JP | 2003333577 A | 11/2003 |
| JP | 2004048704 A | 2/2004 |
| JP | 2004135013 A | 4/2004 |
| JP | 2004165922 A | 6/2004 |
| JP | 2004172830 A | 6/2004 |
| JP | 2004516717 A | 6/2004 |
| JP | 2004516717 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004328613 A | 11/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006033763 A | 2/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007036666 A | 2/2007 |
| JP | 2007089137 A | 4/2007 |
| JP | 3976163 | 6/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2007535881 A | 12/2007 |
| JP | 2008011404 A | 1/2008 |
| JP | 2008016907 A | 1/2008 |
| JP | 2008502212 A | 1/2008 |
| JP | 2008508761 A | 3/2008 |
| JP | 2008508762 A | 3/2008 |
| JP | 2008283232 A | 11/2008 |
| JP | 2008543142 A | 11/2008 |
| JP | 20082383571 A1 | 11/2008 |
| JP | 2009027598 A | 2/2009 |
| JP | 2009522921 | 6/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539832 A | 12/2010 |
| JP | 2011087103 A | 4/2011 |
| JP | 5231218 | 3/2013 |
| JP | 2013510453 A | 3/2013 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| KR | 20100028156 A | 3/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | I246841 B | 1/2006 |
| TW | I354908 | 12/2011 |
| TW | I355168 | 12/2011 |
| WO | WO9634463 A1 | 10/1996 |
| WO | WO-9750183 A1 | 12/1997 |
| WO | WO9804973 A1 | 2/1998 |
| WO | 9832256 A1 | 7/1998 |
| WO | WO9832231 | 7/1998 |
| WO | WO0014921 A1 | 3/2000 |
| WO | WO0018017 | 3/2000 |
| WO | WO0052600 A1 | 9/2000 |
| WO | WO0120786 A1 | 3/2001 |
| WO | WO0157667 A1 | 8/2001 |
| WO | WO0158130 A2 | 8/2001 |
| WO | WO0158131 A2 | 8/2001 |
| WO | WO0227988 A2 | 4/2002 |
| WO | 0249343 A1 | 6/2002 |
| WO | WO0247391 A1 | 6/2002 |
| WO | WO-02063461 A1 | 8/2002 |
| WO | 03046742 A1 | 6/2003 |
| WO | WO03056703 | 7/2003 |
| WO | 03103212 A2 | 12/2003 |
| WO | 03105484 A1 | 12/2003 |
| WO | WO03105350 | 12/2003 |
| WO | WO2004008735 A2 | 1/2004 |
| WO | WO2004015948 A1 | 2/2004 |
| WO | WO2004019521 A1 | 3/2004 |
| WO | WO2004030273 A1 | 4/2004 |
| WO | WO2004034589 A2 | 4/2004 |
| WO | WO-2004036824 A1 | 4/2004 |
| WO | WO-2004047019 A2 | 6/2004 |

(56) References Cited

FOREIGN PATENT DOCUMENTS

| WO | WO2004047455 A1 | 6/2004 |
|---|---|---|
| WO | 2004088988 A1 | 10/2004 |
| WO | 2004109538 A1 | 12/2004 |
| WO | WO-2005022812 | 3/2005 |
| WO | WO2005036753 A2 | 4/2005 |
| WO | WO2005041421 A1 | 5/2005 |
| WO | WO2005078982 A1 | 8/2005 |
| WO | 2005109224 A2 | 11/2005 |
| WO | WO-2005107123 | 11/2005 |
| WO | WO2005112250 A2 | 11/2005 |
| WO | 2006013459 A1 | 2/2006 |
| WO | WO2006020826 A2 | 2/2006 |
| WO | 2006036276 | 4/2006 |
| WO | WO-2006057938 A2 | 6/2006 |
| WO | WO-2006060036 A1 | 6/2006 |
| WO | WO2006084503 A1 | 8/2006 |
| WO | 2006116102 A2 | 11/2006 |
| WO | WO-2006135878 A2 | 12/2006 |
| WO | WO2007042916 | 4/2007 |
| WO | 2007078252 A2 | 7/2007 |
| WO | WO-2007078253 A2 | 7/2007 |
| WO | 2007098480 A1 | 8/2007 |
| WO | WO-2007098397 A2 | 8/2007 |
| WO | WO-2008011549 A2 | 1/2008 |
| WO | 2008023328 A3 | 4/2008 |
| WO | WO2008054100 A1 | 5/2008 |
| WO | WO2008085013 A1 | 7/2008 |
| WO | WO-2008086313 A1 | 7/2008 |
| WO | 2008131023 A1 | 10/2008 |
| WO | WO-2008144004 A1 | 11/2008 |
| WO | WO2008148708 A1 | 12/2008 |
| WO | WO2008156390 A1 | 12/2008 |
| WO | 2009065526 A1 | 5/2009 |
| WO | 2009137705 A2 | 11/2009 |
| WO | WO-2009143741 A1 | 12/2009 |
| WO | 2010027397 A2 | 3/2010 |
| WO | 2010078281 A2 | 7/2010 |
| WO | WO2010085361 A2 | 7/2010 |
| WO | WO2010088420 A1 | 8/2010 |
| WO | WO2010120804 A1 | 10/2010 |
| WO | 2011038013 | 3/2011 |
| WO | 2011038034 A1 | 3/2011 |
| WO | 2011054377 A1 | 5/2011 |
| WO | WO-2011059286 A2 | 5/2011 |
| WO | WO-2011070552 A1 | 6/2011 |
| WO | WO-2011102792 A1 | 8/2011 |
| WO | 2012021540 | 2/2012 |
| WO | 2012109614 A1 | 8/2012 |

OTHER PUBLICATIONS

Office Action from Japanese Application No. 2013-524184, dated Jan. 14, 2014, 4 pp.

Office Action from Australian Application No. 2011289514, dated Mar. 12, 2014, 4 pp.

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, p. 179.

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010.

3GPP TSG-SA4, "Usage of 'mfra' Box for Random Access and Seeking," S4-AHI127 Ad-Hoc Meeting, Dec. 14-16, 2009, 2 pp.

3rd Generation Partnership Project, Technical Specification Group Services and System Aspects Transparent end-to-end packet switched streaming service (PSS), 3GPP file format (3GP) (Release 8) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009, pp. 1-52, XP050370199.

"3rd Generation Partnership Project; Technical Specification Group Services and System Aspects; Transparent end-to-end packet switched streaming service (PSS); 3GPP file format (3GP) (Release 9)", 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010, pp. 1-55, XP050441544, [retrieved on Jun. 9, 2010].

Afzal et al., "Video Streaming over MBMS: A System Design Approach", Journal of Multimedia, vol. 1, No. 5, Aug. 2006, pp. 25-35.

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Alex Zambelli: "IIS Smooth Streaming Technical Overview", Microsoft Mar. 25, 2009, XP002620446, Retrieved from: URL:http://www.microsoft.com/downloads/en/details. aspx?FamilyID=03d22583-3ed6-44da-8464-b1b4b5ca7520, [retrieved on Jan. 21, 2011].

Aljoscha Smolic et al., "Development of a New MPEG Standard for Advanced 3D Video Applications", IEEE International Symposium on Image and Signal Processing and Analysis, Sep. 16, 2009, pp. 400-407, XP031552049, ISBN: 978-953-184-135-1.

Almeroth, et al., "The use of multicast delivery to provide a scalable and interactive video-on-demand service", IEEE Journal on Selected Areas in Communication, 14(6): 1110-1122, (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.

Amin Shokrollahi: "LDPC Codes: An Introduction" Internet Citation 2 Apr. 1, 2003 (Apr. 2, 2003), XP002360065 Retrieved from: URL: http://www.ipm.ac. ir/IPM/homepage/Amin 2.pdf [retrieved on Dec. 19, 2005].

Amon P et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: "Text of ISO/IEC 13818-1:2007/PDAM 6 MVC operation point descriptor", 90 MPEG Meeting; Oct. 26, 2009-Oct. 30, 2009; XIAN; (Motion Picture Expertgroup or ISO/IEC JTC1/SC29/WG11), No. N10942, Nov. 19, 2009, XP030017441.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11),, No. N11139, Jan. 22, 2010, XP030017636.

Apple Inc., "On the time-stamps in the segment-inbox for HTTP streaming (26.244, R9)", TSG-SA4#58 meeting, Vancouver, Canada, Apr. 2010, p. 5.

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 917-924, XP000464977.

Bitner, J.R., et al.: "Efficient Generation of the Binary Reflected Gray code and Its Applications," Communications of the ACM, pp. 517-521, vol. 19 (9), 1976.

(56) References Cited

OTHER PUBLICATIONS

Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Charles Lee L.H.: "Error-Control Block Codes for Communications Engineers", 2000, Artech House, XP002642221, pp. 39-45.
Chen, et al., U.S. Patent Application titled "Frame Packing for Asymmetric Stereo Video", filed Feb. 25, 2011.
Chen, et al., U.S. Patent Application titled "One-Stream Coding for Asymmetric Stereo Video", filed Feb. 25, 2011.
Chen et al., "Coding techniques in Multiview Video Coding and Joint Multiview Video Model", Picture Coding Symposium, 2009, PCS 2009, IEEE, Piscataway, NJ, USA, May 6, 2009, pp. 1-4, XP031491747, ISBN: 978-1-4244-4593-6.
Clark G.C., et al., "Error Correction Coding for Digital Communications, System Applications," Error Correction Coding for Digital Communications, New York, Plenum Press, US, Jan. 1, 1981, pp. 339-341.
Dan, A. et al.: "Scheduling Policies for an On-Demand Video Server with Batching," Proc. ACM Multimedia, pp. 391-398 (Oct. 1998).
Davey, M.C. et al.: "Low Density Parity Check Codes over GF(q)" IEEE Communications Letters, vol. 2, No. 6 pp. 165-167 (1998).
David Singer, et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.
Digital Fountain: "Raptor code specification for MBMS file download," 3GPP SA4 PSM Ad-Hoc #31 (May 21, 2004) XP002355055 pp. 1-6.
Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from URL: http://www.3gpp.org/ftp/tsg_sa/WG4_CODEC/TSGS4_34/Docs.
D.M. Mandelbaum: "An adaptive-feedback coding scheme using incremental redundancy", IEEE Trans on Information Theory, May 1974, pp. 388-389, the whole document.
Eager, et al. "Minimizing bandwidth requirements for on-demand data delivery," Proceedings of the International Workshop on Advances in Multimedia Information Systems, p. 80-87 (Indian Wells, CA Oct. 1999).
Eager, et al., "Optimal and efficient merging schedules for video-on-demand servers", Proc. ACM Multimedia, vol. 7, pp. 199-203 (1999).
Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.
Feng, G., Error Correcting Codes over Z2m for Algorithm-Based Fault-Tolerance, IEEE Transactions on Computers, vol. 43, No. 3, Mar. 1994, pp. 370-374.
Fernando et al., "HTTP Streaming Solution-Response to Call for Proposal," ISO/IEC JTC 1/SC 29/WG 11, M17756, Jul. 2010, 32 pp.
Fielding, et al., "Hypertext Transfer Protocol—HTTP/1.1," Network Working Group, RFC 2616, Jun. 1999, 165 pp.
Frojdh, et al., "File format sub-track selection and switching," ISO/IEC JTC1/SC29/WG11 MPEG2009 M16665, London UK, Jul. 2009, 14 pp.
Gao, L. et al.: "Efficient Schemes for Broadcasting Popular Videos," Proc. Inter. Workshop on Network and Operating System Support for Digital Audio and Video, pp. 1-13 (1998).

Gemmell, et al., "A Scalable Multicast Architecture for One-To-Many Telepresentations", Multimedia Computing and Systems, IEEE International Conference Jun. 28-Jul. 1, 1998, IEEE Comput. Soc, US, pp. 128-139.
Grineberg, et al., "Deliverable D3.2 MVC/SVC storage format" Jan. 29, 2009, XP002599508 Retrieved from URL:http://www.ist-sea.eu/Public/SEA_D3.2_HHI FF_20090129.pdf [retrieved on Sep. 1, 2010] paragraph [02.3].
Hagenauer, J.: "Soft is better than hard" Communications, Coding and Cryptology, Kluwer Publication May 1994, XP002606615 Retrieved from: URL: http://www.Int.ei.turn.de/veroef-fentlichungen/I994/ccc94h. pdf [retrieved on Oct. 25, 2010].
He Wenge et al., "Asymmetric Stereoscopic Video Encoding Algorithm Based on Joint Compensation Prediction", IEEE International Conference on Communications and Mobile Computing, Jan. 6, 2009, pp. 191-194, XP031434775, ISBN: 978-0-7695-3501-2.
Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.
Hitachi Ltd. et al., "High-Definition Multimedia Interface," Specification Version 1.4, Jun. 5, 2009, 425 pp.
Hua, et al., "Skyscraper broadcasting: A new broadcasting system for metropolitan video-on-demand systems", Proc. ACM SIGCOMM, pp. 89-100 (Cannes, France, 1997).
Ian Trow: "Is 3D Event Coverage Using Existing Broadcast Infrastructure Technically Possible?", International Broadcasting Conference, Sep. 9, 2009-Sep. 13, 2009, XP030081671, pp. 4-5, "3D transmission over broadcast infrastructure" pp. 7-8, "Screen signaling"—Conclusions on 3D systems.
Information Technology—Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.
International Standard ISO/IEC 14496-12, Information Technology—Coding of audio-visual objects—Part 12: ISO base media file format, Third Edition, Oct. 15, 2008, 120 pp.
International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.
ISO/IEC 13818-1, "Information technology—Generic coding of moving pictures and associated audio information: Systems," Second edition, Dec. 1, 2000, 174 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
"Joint Draft 8.0 on Multiview Video Coding", 28th JVT meeting, Hannover, Germany, Jul. 2008. available from http:// wftp3. itu.int/av-arch/jvt-site/2008_07_Hannover/JVT-AB204.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kimata H et al., "Inter-view prediction with downsampled reference pictures", ITU Study Group 16—Video Coding Experts Group—ISO/IEC MPEG & ITU-T VCEG(ISO/IEC JTC1/SC29/WG11 and ITU-T SG16 Q6), No. JVT-W079, Apr. 19, 2007, XP030007039.
Kozamernik F: "Media streaming over the Internet", Internet Citation, Oct. 2002, XP002266291, Retrieved from: URL: http://www.ebu.ch/trev_292-kozamernik.pdf [retrieved on Jan. 8, 2004] section "Video codecs for scalable streaming".
Lin, S. et al.: "Error Control Coding-Fundamentals and Applications," 1983, Englewood Cliffs, pp. 288, XP002305226.

(56) References Cited

OTHER PUBLICATIONS

Luby Digital Fountain a Shokrollahi EPFL M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.
Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.
Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, New York, NY, USA, IEEE, US Aug. 16, 199.
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, M. et al.: "Efficient Erasure Correction Codes," 2001, IEEE Transactions on Information Theory, Vo. 47, No. 2, pp. 569-584, XP002305225.
Luby, M. et al.: "Practical Loss-Resilient Codes: Tornado Codes," 29th Annual ACM Symposium on Theory of Computing, vol. Symp. 29, May 4, 1997, pp. 1-10, XP002271229.
Luby, Michael G. "Analysis of Random Processes via And-Or Tree Evaluation," Proceedings of the 9th Annual ACM-SIAM Symposium on Discrete Algorithms, TR-97-0, 1998, pp. 364-373, (search date: Jan. 25, 2010) URL: <http://portal.acm.prg.citation.cfm?id=314722>.
Marpe, et al., "The H.264/MPEG4 Advanced Video Coding Standard and its Applications," Standards Report, IEEE Communications Magazine, Aug. 2006, pp. 134-143.
Min-Goo Kim: "On systematic punctured convolutional codes", IEEE Trans on Communications, vol. 45, No. 2, Feb. 1997, XP002628272, the whole document, pp. 133-139.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos R et al., "HTTP Live Streaming; draft-pantos-http-1ive-streaming-OT.txt ", HTTP Live Streaming; draft-pant0s-http-live-streaming-01.txt, Internet Engineering Task Force, IETF; Standardworkingdraft, Internet Society (ISOC) 4, Rue Des Falaises CH- 1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997, pp. 995-1012, XP00069594.
Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: "A Correction and an Addendum for Variable-Rate Coding for Meteor-Burst Communications," IEEE Transactions on Communications, vol. 43, No. 12 pp. 2866-2867 (Dec. 1995).
Pyle et al., "Microsoft HTTP Smooth Streaming: Microsoft response to the Call for Proposal on HTTP Streaming," 93 MPEG Meeting, ISO/IEC JTC1/SC29/WG11, Jul. 22, 2010, 34 pp.
Qualcomm Europe S A R L: "Baseline Architecture and Definitions for HTTP Streaming", 3GPP Draft; 54-09060_HTTP_Streaming_Architecture, 3rd Generation Partnership Project (3GPP), Mobile Competence Centre; 650, Route Des Lucioles; F-06921 Sophia-Antipolis Cedex; France, No. Kista; 20090812, Aug. 12, 2009, XP050356889.
Qualcomm Incorporated: "Use Cases and Examples for Adaptive HTTP Streaming", 3GPP Draft; S4-100408-USECASES-HSD, 3rd Generation Partnership Project (JGPP), Mobile Competence Centre; 650, Route Des Lucioles; F-06921 Sophia-Antipolis Cedex; France, vol. SA WG4, No. Prague, Czech Republic; 20100621, Jun. 17, 2010, XP050438085, [retrieved on Jun. 17, 2010].
Rangan, et al., "Designing an On-Demand Multimedia Service," IEEE Communication Magazine, vol. 30, pp. 5-65, (Jul. 1992).
RealNetworks et al., "Format for HTTP Streaming Media Presentation Description," 3GPP Draft, S4-100020, Jan. 2010, 12 pp.
Research in Motion UK Limited, "An MPD delta file for HTTP Streaming," 3GPP Meeting No. 59, S4-100453, Jun. 2010, 6 pp.
Rhyu et al., "Response to Call for Proposals on HTTP Streaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.
Rizzo, L. "Effective Erasure Codes for Reliable Computer Communication Protocols," Computer Communication Review, 27 (2) pp. 24-36 (Apr. 1, 1997), XP000696916.
Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Rost, S. et al.: "The Cyclone Server Architecture: streamlining delivery of popular content," 2002, Computer Communications, vol. 25, No. 4, pp. 403-412.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Schwarz, Heiko et al., "Overview of the Scalable Video Coding Extension of the H.264/AVC Standard", IEEE Transactions on Circuits and Systems for Video Technology, vol. 17, No. 9, Sep. 2007, pp. 1103-1120.
Seshan, S. et al.: "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4-Information Technology Generic Coding of Moving Pictures and Audio Systems amendment 4: Transport of Multiview Video over ITU-T Rec H.222.0 ISO/IEC 13818-1" ITU-T Rec. H.222.0(May 2006)FPDAM 4, vol. MPEG2009, No. 10572, May 11, 2009, pp. 1-20, XP002605067 p. 11, last two paragraphs sections 2.6.78 and 2.6.79 table T-1.

(56) References Cited

OTHER PUBLICATIONS

Shokrollahi, A.: "Raptor Codes," Internet Citation [Online] (Jan. 13, 2004) XP002367883, Retrieved from: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm?id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Stockhammer, WD 0.1 of 23001-6 Dynamic Adaptive Streaming over HTTP (DASH), MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29,-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson et al., "Media Presentation Description in HTTP Streaming," 3GPP Draft, S4-100080-MPD, Jan. 2010, 12 pp.
Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.
Vetro, et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan, "Publishing in Wireless and Wireline Environments," Ph. D Thesis, Rutgers, The State University of New Jersey (Nov. 1994).
Wang,"On Random Access", Joint Video Team (JVT) of ISO/IEC MPEG & ITU-T VCEG (ISO/IEC JTC1ISC29/WG11 and ITU-T SG16 Q.6), 4th Meeting: Klagenfurt, Austria, Jul. 22-26, 2002, p. 13.
Wenger S., "RTP Payload Format for H.264 Video", Network Working Group, Feb. 2005, pp. 1-84.
Wong, J.W., "Broadcast delivery", Proceedings of the IEEE, 76(12): 1566-1577, (1988).
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.

Ying Chen et al: "Response to the CfP on HTTP Streaming: Adaptive Video Streaming based on AVC", 93 MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Zorzi, et al.: "On the Statistics of Block Errors in Bursty Channels," IEEE Transactions on Communications, vol. 45, No. 6, Jun. 1997, pp. 660-667.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 13/082,051, by Ying Chen et al., filed Apr. 7, 2011.
U.S. Appl. No. 12/908,593, by Ying Chen et al., filed Oct. 20, 2010.
U.S. Appl. No. 13/205,565, by Ying Chen et al., filed Aug. 8, 2011.
U.S. Appl. No. 13/205,574, by Ying Chen et al., filed Aug. 8, 2011.
International Search Report and Written Opinion of international application No. PCT/US2011/047121, dated Oct. 26, 2011, 12 pp.
Choi, S., "Temporally enhanced erasure codes for reliable communication protocols" Computer Networks, vol. 38, No. 6, Apr. 22, 2002, 18 pp.
Li, J., "The Efficient Implementation of Reed-Solomon High Rate Erasure Resilient Codes" IEEE International Conference on Acoustics, Speech, and Signal Processing, vol. 3, Mar. 18, 2005, 4 pp.
Nokia, "Reed-Solomon Code Specification for MBMS Download and Streaming Services," 3rd Generation Partnership Project, May 9-13, 2005, 12 pp.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet:URL:http://www.etsi.org/deliver/etsi_ts/126300_126399/126346/06.01.00_60/ts_126346v060100p.pdf, 102 pp.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011, 92 pp.
"Technologies under Consideration", 100. MPEG Meeting;Apr. 30, 2012-May 4, 2012; Geneva; (Motion Picture Expert Group or ISO/IEC JTC1 /SC29/WG11),, No. N12682, Jun. 7, 2011, 7 pp.
"Technologies under Consideration", 98. MPEG Meeting; Nov. 28, 2011-Dec. 2, 2011; Geneva; (Motion Picture Expert Group or ISO/IEC JTC1/SC29/WG11),, No. N12330, Dec. 3, 2011, 18 pp.
"Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11),, No. N12329, Jan. 5, 2012, 130 pp.
ATIS: "PTV Contect On Demand Service", IIF-WT-063R44, Nov. 11, 2010, 138 pp.
Bouazizi I., et al., "Proposals for ALC/FLUTE server file format (14496-12Amd.2)", 77. MPEG Meeting; Jul. 17, 2006-Jul. 21, 2006; Klagenfurt; (Motion Picutreexpert Group or ISO/IEC JTC1/SC29/WG11), No. M13675, Jul. 12, 2006, 21 pp.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009, 66 pp.
Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion Pictureexpert Group or ISO/ IEC JTC1/SC29/WG11),, No. M13855, Oct. 13, 2006, 30 pp.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP", 97. MPEG Meeting; Jul. 8, 2011-Jul. 22, 2011;

(56) References Cited

OTHER PUBLICATIONS

Torino; (Motion Picture Expert Group or ISO/IEC JTC1/SC29/WG11) No. m21096, Jul. 21, 2011, 5 pp.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, 7 pp.
Hikaru S., "Blocked Algorithm for LU Decomposition" Journal of the Information Processing Society of Japan, Mar. 15, 1993, vol. 34, No. 3, 11 pp.
ITU-T H.264, Series H: Audiovisual and Multimedia Systems, Infrastructure of audiovisual services—Coding of moving video, Advanced video coding for generic audiovisiual services, The International Telecommunication Union. Jun. 2011, 674 pp.
Jiang J., "File Format for Scalable Video Coding", PowerPoint Presentation for CMPT 820, Summer 2008, 28 pp.
Kim J., et al., "Enhanced Adaptive Modulation and Coding Schemes Based on Multiple Channel Reporting's for Wireless Multicast Systems", 62nd IEEE Vehicular Technology Conference, VTC-2005-FALL, Sep. 25-28, 2005, vol. 2, pp. 725-729.
Li, M., et al., "Playout Buffer and Rate Optimization for Streaming over IEEE 802.11 Wireless Networks", Aug. 2009, Worcester Polytechnic Institute, USA, 25 pp.
Luby et al., RaptorQ Forward Error Correction Scheme for Object Delivery draft-ietf-rmt-bb-fec-raptorq-00, Qualcomm, Inc. Jan. 28, 2010, 37 pp.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Michael G et al., "Improved low-density parity-check codes using irregular graphs", Information Theory, IEEE Transactions on, Feb. 2001, vol. 47, No. 2, pp. 585-598.
Miller G., et al., "Bounds on the maximum likelihood decoding error probability of low density parity check codes", Information Theory, 2000. Proceedings. IEEE International Symposium on, 2000, p. 290.
Moriyama, S., "5. Present Situation of Terrestrial Digital Broadcasting in Europe and USA", Journal of The Institute of Image Information and Television Engineers, Nov. 20, 1999, vol. 53, No. 11, pp. 1476-1478.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_To_BCAST_File_Delivery, Open Mobile Alliance, San Diego, CA, Oct. 2, 2007, 13 pp.
Muramatsu J., et al., "Low density parity check matrices for coding of multiple access networks", Information Theory Workshop, 2003, Proceeding. 2003 IEEE , Apr. 4, 2003, pp. 304-307.
Ohashi a et al., "Low-Density Parity-Check (LDPC) Decoding of Quantized Data," Technical Report of the Instutute of Electronics, Information and Communications Engineers, Aug. 23, 2002, vol. 102, No. 282, pp. 47-52.
Qualcomm Incorporated: "RaptorQ Technical Overview", pp. 1-12, Oct. 1, 2010, 12 pp.
Roumy A., et al., "Unequal Erasure Protection and Objct Bundle Protection with the Generalized Object Encoding Approach", Inria-00612583, Version 1, Jul. 29, 2011, 25 pp.
Schulzrinne, et al., "Real Time Streaming Protocol (RTSP)" Network Working Group, Request for Comments: 2326, Apr. 1998, pp. 1-92.
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011, 15 pp.
Wadayama T, "Introduction to Low Density Parity Check Codes and Sum-Product Algorithm,", Technical Report of the Institute of Electronics, Information and Communication Engineers, Dec. 6, 2001, vol. 101, No. 498, pp. 39-46.

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Yamazaki M., et al., "Multilevel Block Modulation Codes Construction of Generalized DFT,"Technical Report of the Institue of Electronics, Information and Communications Engineers, Jan. 24, 1997, vol. 96, No. 494, pp. 19-24.
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010,P.85-102,URL,http://www.3gpp.org/ftp/TSG_SA/WG4_CODEC/TSGS4_59/Docs/S4-100511.zip, 26234-930.zip, 182 pp.
Nternational Preliminary Report on Patentability—PCT/US2011/047121—The International Bureau of WIPO Geneva, Switzerland, Nov. 21, 2012, 8 pp.
Lee, "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Luby, "LT Codes", Foundations of Computer Science, 2002, Proceedings, The 43rd Annual IEEE Symposium on, 2002, 44 pp.
Morioka S., "A Verification Methodology for Error Correction Circuits over Galois Fields", Tokyo Research Laboratory, IBM Japan Ltd, pp. 275-280, Apr. 22-23, 2002.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc, 20 pp.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Re1-9.doc., 17 pp.
Tsunoda, T. et al., "Reliable Streaming Contents Delivery by Using Multiple Paths, " Institue of Electronics, Information, and Communications Engineers, vol. 103, No. 692, Mar. 2004, 4 pp., (English copy of abstract only).
Albanese, A. et al., "Priority Encoding Transmission," IEEE Transactions on Information Theory, vol. 42, No. 6, Nov. 1996, 22 pp.
Anonymous, "Information Technology—Coding of audio-visual objects; Part 12: ISO base media file format," International Standard, ISO/IEC 14496-12, Third edition, 2008, 138 pp.
Byers, J. et al., "Accessing multiple mirror sites in parallel: using Tornado codes to speed up downloads," 1999, IEEE, Mar. 21, 1999, 9 pp.
Gozalvez, D. et al. "AL-FEC for Improved Mobile Reception of MPEG-2 DVB-T Transport Streams," International Journal of Digital Multimedia Broadcasting, vol. 2009, Dec. 31, 2009, 10 pp.
European Broadcasting Union, "Digital Video Broadcasting (DVB); Guidelines for the implementation of DVB-IP Phase 1 specifications" ETSI Standards, vol. BC, V1.2.1, Apr. 1, 2008, 84 pp.
Digital Video Broadcasting, "Transport of MPEG 2 Transport Stream (TS) Based DVB Services over IP Based Networks," DVB BlueBook A086 Rev. 4, Mar. 2007, 125 pp.
Gasiba, T. et al., "System Design and Advanced Receiver Techniques for MBMS Broadcast Services," IEEE, Jun. 1, 2006, 7 pp.
Goyal, V., "Multiple Description Coding: Compression Meets the Network," IEEE Signal Processing Magazine, vol. 18, Issue 5, Sep. 2001, 20 pp.
Gozalvez, D. et al., "Mobile reception of DVB-T services by means of AL-FEC protection," IEEE, May 3, 2009, 5 pp.
Rosenberg, J. et al. "An RTP Payload Format for Generic Forward Error Correction," Network Working Group, RFC 2733, Dec. 1999, 25 pp.

(56) References Cited

OTHER PUBLICATIONS

International Organization for Stanrdaisation, "Requirements on HTTP Streaming of MPEG Media," ISO-Requirements Group, ISO/IEC- JTC1/SC29/WG11 N11340, May 14, 2010, 5 pp.

Lee L., et al., "VLSI implementation for low density parity check decoder", IEEE, Sep. 2, 2001, 4 pp.

Paila, T. et al., "FLUTE—File Delivery over Unidirectional Transport," Network Working Group, IETF RFC 3926, Oct. 2004, 29 pp.

Luby, M. et al., "Layered Coding Transport (LCT) Building Block", Network Working Group, IETF RFC 5651, Oct. 2009, 42 pp.

Watson, M. et al. "Forward Error Correction (FEC) Building Block," Network Working Group, IETF RFC 5052, Aug. 2007, 31 pp.

Luby, M. et al., "Raptor Forward Error Correction Scheme for Object Delivery", Network Working Group, IETF RFC 5053, Sep. 2007, 47 pp.

Luby, M. et al., "RaptorQ Forward Error Correction Scheme for Object Delivery," Reliable Multicast Transport, IETF draft ietf-rmt-bb-fec-raptorq-04, Aug. 24, 2010, 69 pp.

Luby, M. et al., "The Use of Forward Error Correction (FEC) in Reliable Multicast," Network Working Group, IETF RFC 3453, Dec. 2002, 19 pp.

Luby, M. et al., "Application Layer FEC in IPTV Services" IEEE Communications Magazine, vol. 46, No. 5, May 1, 2008, 8 pp.

Luby, M. et al., "Pairwise Independence and Derandomization," Foundations and Trends in Theoretical Computer Science, vol. 1, Issue 4, 2005, 76 pp.

Matsuoka, H. et al., "Low-Density Parity-Check Code Extensions Applied for Broadcast-Communication Integrated Content Delivery," IEICE, ITC-SS21, 2010, 5 pp.

McCanne, S. et al., "Low-Complexity Video Coding for Receiver-Driven Layered Multicast," IEEE Journal on Selected Areas in Communication, Aug. 1, 1997, vol. 15, No. 6, 19 pp.

Mimnaugh, A. et al., "Enabling Mobile Coverage for DVB-T" Digital Fountain, Jan. 29, 2008, 9 pp.

Roca, V., et al., "Low Density Parity Check (LDPC) Staircase and Triangle Forward Error Correction (FEC) Schemes," Network Working Group, IETF RFC 5170, Jun. 2008, 34 pp.

3 Generation Partnership Project, "Transparent end-to-end Packet-switched Streaming Service (PSS),"3GPP TS 26.234, Version 9.3.0, Release 9, Jan. 22, 2010, 178 pp.

Watson, M. et al., "Asynchronous Layered Coding (ALC) Protocol Instantiation," Internet Engineering Task Force, RFC 5775, Apr. 2010, 23 pp.

Huawei et al., "Implicit mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex ; France, vol. RAN WG1, Warsaw, Poland, Jun. 24, 2008, XP050110650, [retrieved on Jun. 24, 2008]. (4 pp.).

Luby, M. et al., Qualcomm Incorporated, "Universal Object Delivery using RaptorQ; draft-luby-uod-raptorq-00.txt", Internet Engineering Task Force (IETF), Standardworkingdraft, Internet Society (ISOC), Mar. 7, 2011, pp. 1-9, XP015074424, [retrieved on Mar. 7, 2011].

Pantos, "HTTP Live Streaming draft-pantos-http-live-streaming-02", Informational, Internet-Draft, http://tools.ietf.org/html/draft-pantos-http-live-streaming-02, pp. 1-20, Oct. 5, 2009.

3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.

Luby M., "Simple Forward Error Correction (FEC) Schemes," draft-luby-rmt-bb-fec-supp-simple-00.txt, pp. 1-14, Jun. 2004.

Ramsey, "HTTP Status: 206 Partial Content and Range Requests," May 5, 2008, 5 pp.

Chikara, et al., "Add-on Download Scheme for Multicast Content Distribution Using LT Codes", IEICE. B, Communications, Aug. 2006, J89-B (8), pp. 1379-1389.

Hasan, et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, XP000525729, pp. 938-942.

Luby, et al., Qualcomm Incorporated: "RatorQ Forward Error Correction Scheme for Object Delivery draft-ietf-rmt-bb-fec-raptorq-04", Internet Engineering Task Force, IETF, May 5, 2011, 69 pp.

Tetsuo, et al., "Comparison of Loss Resilient Ability between Multi-Stage and Reed-Solomon Coding", Technical report of IEICE. CQ, Communication Quality, vol. 103 (178), Jul. 4, 2003, pp. 19-24.

Watson, et al., "Forward Error Correction (FEC) Framework draft-ietf-fecframe-framework-11," 2011, URL,http://tools.ietf.org/pdf/draft-ietf-fecframe-framework-11.pdf, 38 pp.

Watson, et al., "Raptor FEC Schemes for FECFRAME draft-ietf-fecframe-raptor-04," 2010, URL,http://tools.ietf.org/pdf/draft-ietf-fecframe-raptor-04.pdf, 21 pp.

Gerard F., et al., "HTTP Streaming MPEG media—Response to CFP", MPEG Meeting, Geneva Jul. 26, 2010 to Jul. 30, 2010, 31 pp.

Qualcomm Incorporated: "Pseudo CR: Adaptive HTTP Streaming—Full Solution Proposal," 3GPP TSG-SA WG4#57 S4-100060, Jan. 29, 2010, 17 pp.

\* cited by examiner

REPRESENTATION GROUPS FOR NETWORK STREAMING OF CODED MULTIMEDIA DATA

This application claims the benefit of U.S. Provisional Application No. 61/372,399, filed Aug. 10, 2010, which is hereby incorporated by reference in its entirety.

CROSS-REFERENCE TO RELATED APPLICATIONS

The present Application for Patent is related to the following co-pending U.S. patent applications:
"TRICK MODES FOR NETWORK STREAMING OF CODED VIDEO DATA" by Stockhammer et al., having Ser. No. 13/205,556, filed concurrently herewith, assigned to the assignee hereof, and expressly incorporated by reference herein; and
"MANIFEST FILE UPDATES FOR NETWORK STREAMING OF CODED VIDEO DATA" by Stockhammer et al., having Ser. No. 13/205,574, filed concurrently herewith, assigned to the assignee hereof, and expressly incorporated by reference herein.

TECHNICAL FIELD

This disclosure relates to storage and transport of encoded multimedia data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

SUMMARY

In general, this disclosure describes techniques for improving streaming of media data over a network. These techniques include support for trick modes, such as fast forward, rewind, and seeking within media content streamed over a network. These techniques also include support for representation groups, such as signaling common characteristics for a group of representations, as well as individual characteristics of the representations. Moreover, the techniques include providing information for updating manifest files for streamed media content. The techniques also include providing media data for targeted advertisements as external periods for media content. These techniques further include providing and interpreting quality of experience reports from a client device to a service provider. Furthermore, these techniques include signaling of profile data to which a manifest file of media content conforms.

In one example, a method of retrieving video data includes analyzing at least a portion of a manifest file for multimedia content, wherein the portion of the manifest file includes information indicative of sets of representations of the multimedia content and information indicative of common characteristics for each of the sets of representations, selecting one of the sets of representations based on the common characteristics for the one of the sets of representations, selecting one of the representations of the selected one of the sets of representations based on one or more coding characteristics of the one of the representations of the one of the sets, and generating a request for data of the one of the representations based on the selection.

In another example, a device for receiving information for video data includes one or more processors configured to analyze at least a portion of a manifest file for multimedia content, wherein the portion of the manifest file includes information indicative of sets of representations of the multimedia content and information indicative of common characteristics for each of the sets of representations, select one of the sets of representations based on the common characteristics for the one of the sets of representations, select one of the representations of the selected one of the sets of representations based on one or more coding characteristics of the one of the representations of the one of the sets, and generate a request for data of the one of the representations based on the selection.

In another example, a device for receiving information for video data includes means for analyzing at least a portion of a manifest file for multimedia content, wherein the portion of the manifest file includes information indicative of sets of representations of the multimedia content and information indicative of common characteristics for each of the sets of representations, means for selecting one of the sets of representations based on the common characteristics for the one of the sets of representations, means for selecting one of the representations of the selected one of the sets of representations based on one or more coding characteristics of the one of the representations of the one of the sets, and means for generating a request for data of the one of the representations based on the selection.

In another example, a computer program product includes a computer-readable storage medium comprises instructions that, when executed, cause a processor of a device for retrieving video data to analyze at least a portion of a manifest file for multimedia content, wherein the portion of the manifest file includes information indicative of sets of representations of the multimedia content and information indicative of common characteristics for each of the sets of representations, select one of the sets of representations based on the common characteristics for the one of the sets of representations, select one of the representations of the selected one of the sets of representations based on one or more coding characteristics of the one of the representations of the one of the sets, and generate a request for data of the one of the representations based on the selection.

In another example, a method of sending information for video data includes obtaining a set of representations of multimedia content having one or more common characteristics, wherein each of the representations in the set have one or more individual coding characteristics separate from the common characteristics, obtaining a manifest file for the multimedia content, wherein the manifest file includes information indicative of the representations in the set, information indicative of the common characteristics for the set of representations, and information indicative of the coding characteristics for each of the representations in the set, and sending at least a portion of the manifest file to a client device.

In another example, a device for sending information for video data, the device comprising one or more processors configured to obtain a set of representations of multimedia content having one or more common characteristics, wherein each of the representations in the set have one or more individual coding characteristics separate from the common characteristics, obtaining a manifest file for the multimedia content, wherein the manifest file includes information indicative of the representations in the set, information indicative of the common characteristics for the set of representations, and information indicative of the coding characteristics for each of the representations in the set, and send at least a portion of the manifest file to a client device.

In another example, a device for sending information for video data includes means for obtaining a set of representations of multimedia content having one or more common characteristics, wherein each of the representations in the set have one or more individual coding characteristics separate from the common characteristics, means for obtaining a manifest file for the multimedia content, wherein the manifest file includes information indicative of the representations in the set, information indicative of the common characteristics for the set of representations, and information indicative of the coding characteristics for each of the representations in the set, and means for sending at least a portion of the manifest file to a client device.

In another example, a computer program product includes a computer-readable storage medium comprises instructions that cause a processor of a device for providing video data to obtain a set of representations of multimedia content having one or more common characteristics, wherein each of the representations in the set have one or more individual coding characteristics separate from the common characteristics, obtain a manifest file for the multimedia content, wherein the manifest file includes information indicative of the representations in the set, information indicative of the common characteristics for the set of representations, and information indicative of the coding characteristics for each of the representations in the set, and send at least a portion of the manifest file to a client device.

In another example, a method of retrieving video data includes analyzing information of a manifest file for multimedia content, wherein the information of the manifest file indicates that at least one representation of the multimedia content includes a temporal sub-sequence, determining one or more locations of data for the temporal sub-sequence, and submitting one or more requests for the data for the temporal sub-sequence.

In another example, a device for retrieving video data includes one or more processors configured to analyze information of a manifest file for multimedia content, wherein the information of the manifest file indicates that at least one representation of the multimedia content includes a temporal sub-sequence, determine one or more locations of data for the temporal sub-sequence, and submit one or more requests for the data for the temporal sub-sequence.

In another example, a device for retrieving video data includes means for analyzing information of a manifest file for multimedia content, wherein the information of the manifest file indicates that at least one representation of the multimedia content includes a temporal sub-sequence, means for determining one or more locations of data for the temporal sub-sequence, and means for submitting one or more requests for the data for the temporal sub-sequence.

In another example, a computer program product includes a computer-readable medium having stored thereon instructions that, when executed, cause a processor of a device for retrieving video data to analyze information of a manifest file for multimedia content, wherein the information of the manifest file indicates that at least one representation of the multimedia content includes a temporal sub-sequence, determine one or more locations of data for the temporal sub-sequence, and submit one or more requests for the data for the temporal sub-sequence.

In another example, a method of sending information for video data includes obtaining data for at least one representation of multimedia content that includes a temporal sub-sequence, obtaining data for a manifest file for the multimedia content, wherein information of the manifest file indicates that the at least one representation of the multimedia content includes the temporal sub-sequence, and sending at least a portion of the manifest file to a client device.

In another example, a device for sending information for video data includes one or more processors configured to obtain data for at least one representation of multimedia content that includes a temporal sub-sequence, obtain data for a manifest file for the multimedia content, wherein information of the manifest file indicates that the at least one representation of the multimedia content includes the temporal sub-sequence, and send at least a portion of the manifest file to a client device.

In another example, a device for sending information for video data includes means for obtaining data for at least one representation of multimedia content that includes a temporal sub-sequence, means for obtaining data for a manifest file for the multimedia content, wherein information of the manifest file indicates that the at least one representation of the multimedia content includes the temporal sub-sequence, and means for sending at least a portion of the manifest file to a client device.

In another example, a computer program product includes a computer-readable medium having stored thereon instructions that, when executed, cause a processor of a device for sending information for video data to obtain data for at least one representation of multimedia content that includes a temporal sub-sequence, obtain data for a manifest file for the multimedia content, wherein information of the manifest file indicates that the at least one representation of the multimedia content includes the temporal sub-sequence, and send at least a portion of the manifest file to a client device.

In another example, a method of retrieving video data includes retrieving data of a first segment of a representation of multimedia content in accordance with data of a copy of a manifest file stored by a client device, retrieving a portion of a second segment of the representation in accordance with the manifest file, wherein the second segment occurs after the first segment in the representation, and wherein the portion of the second segment indicates that the manifest file is to be updated, updating the copy of the manifest file stored by the client device based on the indication that the manifest file is to be updated, and retrieving media data of the second segment in accordance with the updated manifest file.

In another example, a device for retrieving video data includes one or more processors configured to retrieve data of a first segment of a representation of multimedia content in accordance with data of a copy of a manifest file stored by the device, retrieve a portion of a second segment of the representation in accordance with the manifest file, wherein the second segment occurs after the first segment in the representation, and wherein the portion of the second segment indicates that the manifest file is to be updated, update the copy of the manifest file stored by the device based on the indication that the manifest file is to be updated, and retrieve media data of the second segment in accordance with the updated manifest file.

In another example, a device for retrieving video data includes means for retrieving data of a first segment of a representation of multimedia content in accordance with data of a copy of a manifest file stored by the device, means for retrieving a portion of a second segment of the representation in accordance with the manifest file, wherein the second segment occurs after the first segment in the representation, and wherein the portion of the second segment indicates that the manifest file is to be updated, means for updating the copy of the manifest file stored by the device based on the indication that the manifest file is to be updated, and means for retrieving media data of the second segment in accordance with the updated manifest file.

In another example, a computer program product includes a computer-readable medium having stored thereon instructions that, when executed, cause a processor of a device for retrieving video data to retrieve data of a first segment of a representation of multimedia content in accordance with data of a copy of a manifest file stored by the device, retrieve a portion of a second segment of the representation in accordance with the manifest file, wherein the second segment occurs after the first segment in the representation, and wherein the portion of the second segment indicates that the manifest file is to be updated, update the copy of the manifest file stored by the device based on the indication that the manifest file is to be updated, and retrieve media data of the second segment in accordance with the updated manifest file.

In another example, a method of sending information for video data includes sending data of a manifest file of multimedia content to a client device, wherein the manifest file includes information indicative of a first segment of a representation of the multimedia content, sending at least a portion of the first segment of the representation to the client device in response to a request from the client device, wherein the portion of the first segment indicates that the manifest file is to be updated, wherein an updated version of the manifest file includes information indicative of a second, different segment of the representation, and sending, in response to a request received from the client device and formed according to the updated manifest file, data of the second segment to the client device.

In another example, a device for sending information for video data includes one or more processors configured to send data of a manifest file of multimedia content to a client device, wherein the manifest file includes information indicative of a first segment of a representation of the multimedia content, send at least a portion of the first segment of the representation to the client device in response to a request from the client device, wherein the portion of the first segment indicates that the manifest file is to be updated, wherein an updated version of the manifest file includes information indicative of a second, different segment of the representation, and send, in response to a request received from the client device and formed according to the updated manifest file, data of the second segment to the client device.

In another example, a device for sending information for video data includes means for sending data of a manifest file of multimedia content to a client device, wherein the manifest file includes information indicative of a first segment of a representation of the multimedia content, means for sending at least a portion of the first segment of the representation to the client device in response to a request from the client device, wherein the portion of the first segment indicates that the manifest file is to be updated, wherein an updated version of the manifest file includes information indicative of a second, different segment of the representation, and means for sending, in response to a request received from the client device and formed according to the updated manifest file, data of the second segment to the client device.

In another example, a computer program product includes a computer-readable medium having stored thereon instructions that, when executed, cause a processor of a device for sending information for video data to send data of a manifest file of multimedia content to a client device, wherein the manifest file includes information indicative of a first segment of a representation of the multimedia content, send at least a portion of the first segment of the representation to the client device in response to a request from the client device, wherein the portion of the first segment indicates that the manifest file is to be updated, wherein an updated version of the manifest file includes information indicative of a second, different segment of the representation, and send, in response to a request received from the client device and formed according to the updated manifest file, data of the second segment to the client device.

The details of one or more examples are set forth in the accompanying drawings and the description below. Other features, objects, and advantages will be apparent from the description and drawings, and from the claims.

DETAILED DESCRIPTION

Figure 1:
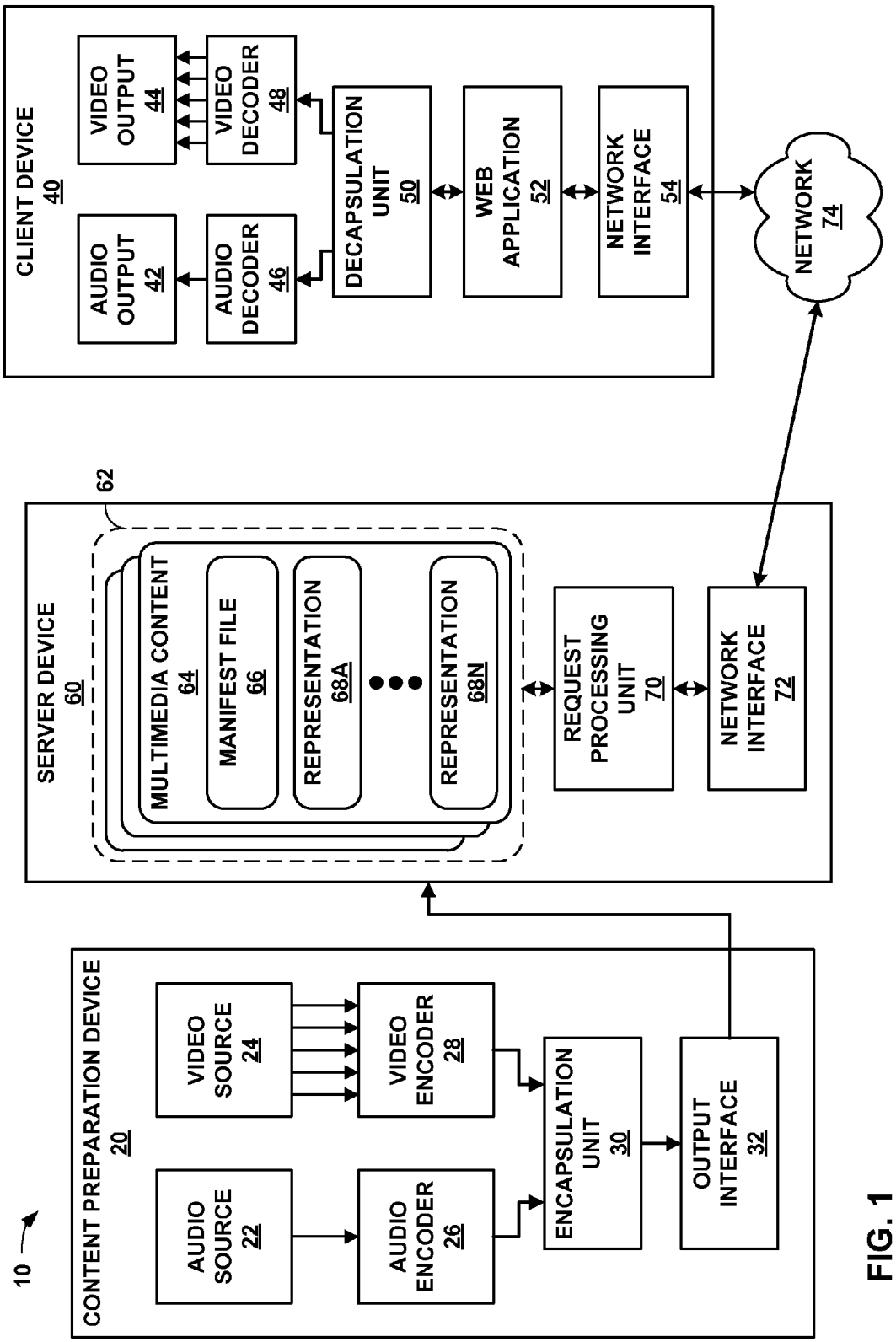
FIG. 1 is a block diagram illustrating an example system that implements techniques for streaming media data over a network.

In general, this disclosure describes techniques for streaming multimedia data, such as audio and video data, over a network. The techniques of this disclosure may be used in conjunction with dynamic adaptive streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other audio/video content, which may also include text overlays or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form a representation group, in that representations in the set can be used for bandwidth adaptation. That is, representations in the set may differ in bitrate, but otherwise share substantially the same characteristics. In this manner, a client device may determine various sets of common characteristics for representation groups of multimedia content, and select a representation group based on coding and rendering capabilities of the client device. Then, the client device may adaptively switch between representations in the selected representation group based on bandwidth availability.

The content preparation device may also provide separate network locations for different portions of a manifest file, such as a media presentation description (MPD) file in a format prescribed by 3GPP (Third Generation Partnership Project). That is, different portions of the manifest file may be independently addressable by, e.g., various uniform resource identifiers (URIs), such as uniform resource locators (URLs). An initial portion of the manifest file may include a URI, URL, or other location identifier of another portion of the manifest file. For example, a first portion of the manifest file may include descriptions of common characteristics of representation groups, as discussed above.

Each of the representation groups may be associated with a respective different portion of the manifest file, which may include data indicative of locations of media data of representations in the respective representation group. In this manner, a client device may receive the first portion of the manifest file, select an appropriate representation group, retrieve another portion of the manifest file for the selected representation group, select a representation of the selected group, and use the other portion of the manifest file to retrieve data of the selected representation. Moreover, the client device may adapt to changing network bandwidth using the other portion of the manifest file, that is, the portion specific to the selected representation group.

Additionally or alternatively, a portion of a manifest file may refer to another portion of the manifest file for other purposes. That is, a portion of the manifest file may direct a client device to another portion of the manifest file for inserting media data of a remote period into a movie during playback. The remote period may correspond to an advertisement, in some examples. These techniques may be used for targeted advertising, in some examples. A client device may provide user information, such as user identifier, user preferences for advertisements, and/or user demographic information, to a server device, which may select a portion of the manifest file based on the user information. Thus, when dereferenced, an external portion of the manifest file may be incorporated into the original manifest file, e.g., by the client device. The server device may provide a location of the portion of the manifest file associated with targeted advertisement media content to the client device. The client device may then retrieve and present data of the targeted advertisement media content before retrieving data of a particular representation of a period of requested multimedia content. In this manner, a first portion of a manifest file for multimedia content may refer to a second portion of the manifest file.

In some instances, a user may wish to play video data in a manner other than from start to finish. For example, a user may wish to play video data in fast forward or rewind modes, or starting from a particular playback point. Such modes of video playback, which are modes other than playing from start to finish, may be referred to as "trick modes." In trick modes, because not all video data will ultimately be played, all of the video data need not be retrieved. This disclosure provides techniques for supporting trick modes as well. For example, a content preparation device may provide indications of byte range locations of frames in video data used for trick modes, such as instantaneous decoder refresh (IDR) pictures. In general, IDR pictures can be decoded without reference to data of any frames external to the IDR pictures themselves. Frames or slices of IDR pictures are generally coded in an intra-prediction mode, to avoid dependencies on other frames or slices. In this manner, the client device can retrieve information indicative of locations of IDR pictures to download only data for the IDR pictures for use in displaying video data in a trick mode, such as fast forward. Other data may be included in the temporal sub-sequence as well. Data may be arranged in coding order, such that data used for reference occurs earlier than (and in continuous byte sequence with) referencing data. For example, an I-frame may precede a P frame, which may proceed one or more B-frames, any or all of which may precede other B-frames that may refer to the earlier B-frame in a hierarchical fashion.

In some examples, a manifest file, such as an MPD, may require occasional updates. This disclosure also provides techniques for signaling and receiving indications that an MPD requires an update. In particular, a content preparation device may include data in segments of representations indicating that a corresponding MPD requires an update. This data may correspond to an initial element of a segment, which may indicate the updates to apply to the MPD and/or locations from which a client device can retrieve updates to the MPD. The updates may comprise an entirely new MPD or incremental updates relative to a previous MPD for the multimedia content.

This disclosure further includes techniques for providing feedback from client devices to a server device and/or content preparation device. The feedback may correspond to, for example, information indicative of data that was retrieved for multimedia content. An administrator or other user of the content preparation device and/or server may use such information in a variety of ways. For example, the user may configure a content delivery network (CDN) to cache data of more frequently accessed representations in proxy devices of the CDN, such as routers or other devices. As another example, the user may determine representations that are accessed more frequently to determine whether certain representations should be added or removed to or from the current multimedia content, and/or how to encode representations of future multimedia content.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Multimedia content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by various characteristics, such as encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In accordance with the techniques of this disclosure, portions of manifest file 66 may be stored in separate locations, e.g., locations of storage medium 62 or another storage medium, potentially of another device of network 74 such as a proxy device.

In some examples, representations 68 may be separated into representation groups. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the representation group, rating information that describes content suitability for particular audiences, or the like.

Manifest file 66 may include data indicative of the subsets of representations 68 corresponding to particular representation groups, as well as common characteristics for the representation groups. Manifest file 66 may also include data representative of individual characteristics, such as bitrates, for individual representations of representation groups. In this manner, a representation group may provide for simplified network bandwidth adaptation. Representations in a representation group may be indicated using child elements of a representation group element of manifest file 66.

Manifest file 66 may also (that is, additionally or alternatively) signal trick mode information for one or more of representations 68. In some examples, one or more of representations 68 may include a respective temporal sub-sequence for trick mode support. A trick mode generally corresponds to a playback mode for a representation in which data of the representation is not played from start to finish, but instead, may begin at a specified temporal location (e.g., to allow for seeking to a particular temporal location), or skip one or more frames in either the forward or reverse temporal direction (e.g., fast forward or rewind).

To provide for trick modes, multimedia content 64 may include information representative of locations of data for temporal sub-sequences of corresponding representations 68. In some examples, manifest file 66 may include information representative of locations of data for the temporal sub-sequences. In other examples, representations 68 themselves may include the information representative of locations of data for the temporal sub-sequences. In still other examples, both representations 68 and manifest file 66 may include information representative of locations of data for the temporal sub-sequences.

In some examples, content preparation device 20 may prepare media content as the media content is being recorded, e.g., for live services. Encapsulation unit 30 may in some cases need to periodically update a manifest file for the media content. Encapsulation unit 30 may even update the manifest file within a particular period of the media content. In accordance with the techniques of this disclosure, encapsulation unit 30 may form segments of a representation that include data indicating that the manifest file is to be updated. Encapsulation unit 30 may provide the updates in the segments themselves or in a separate location from which client devices, such as client device 40 may retrieve the updates to the manifest file. In this manner, when manifest file 66 needs to be updated within a particular period of multimedia content 64, encapsulation unit 30 may form a segment of one or more of representations 68 indicating that manifest file 66 is to be updated.

In some examples, manifest file 66 may include data for inserting data of a remote period into multimedia content 64 during playback. For example, rather than encoding advertisements within multimedia content 64, content preparation device 20 may prepare one or more separate advertisement media contents to be incorporated into multimedia content 64 during playback. Client device 40 may in some examples provide user specific information such that advertisements can be targeted to a user of client device 40, such that a user of client device 40 receives advertisements that are most preferable and informative to the user. In response to a set of user information, server device 60 may provide a targeted advertisement portion of the manifest file to client device 40, which may cause client device 40 to retrieve data of targeted advertisement multimedia content. In this manner, two or more viewers of the same multimedia content 64 may receive different targeted advertisements, such that the advertisements are most relevant and useful for the users.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, web application 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Web application 52 may comprise, for example, a web browser or a media client configured to submit HTTP GET and partial GET requests. Web application 52 may correspond to software instructions executed by one or more processors or processing units (not shown) of client device 40. In some examples, all or portions of the functionality described with respect to web application 52 may be implemented in hardware, or a combination of hardware, software, and/or firmware, where requisite hardware may be provided to execute instructions for software or firmware.

Web application 52 may compare the decoding and rendering capabilities of client device 40 to characteristics of representations 68 indicated by information of manifest file 66. Web application 52 may initially retrieve at least a portion of manifest file 66 to determine characteristics of representations 68. For example, web application 52 may request a portion of manifest file 66 that describes characteristics of one or more representation groups, in accordance with the techniques of this disclosure. Web application 52 may select a subset of representations 68 (e.g., a representation group) having characteristics that can be satisfied by the coding and rendering capabilities of client device 40. Web application 52 may then determine bitrates for representations in the representation group, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, web application 52 may retrieve data from relatively high bitrate representations, whereas when available network bandwidth is low, web application 52 may retrieve data from relatively low bitrate representations. In this manner, client device 40 may stream multimedia data over network 74 while also adapting to changing network bandwidth availability of network 74.

As noted above, in some examples, client device 40 may provide user information to, e.g., server device 60 or other devices of a content delivery network. Web application 52, for example, may collect a user identifier, user identifier, user preferences, and/or user demographic information, and provide such user information to server device 60. Web application 52 may then receive a manifest file associated with targeted advertisement media content, to use to insert data from the targeted advertisement media content into media data of requested media content during playback.

At times, a user of client device 40 may interact with web browser 52 using user interfaces of client device 40, such as a keyboard, mouse, stylus, touchscreen interface, buttons, or other interfaces, to request that a selected one of representations 68 be played in a trick mode. For example, the user may select a particular temporal location from which to begin playback, or to skip or seek to a particular temporal location. As another example, the user may elect to fast forward or rewind the representation.

In response to such requests from a user, web application 52 may determine whether one of representations 68 includes a temporal sub-sequence, to perform the requested trick mode. As an example, a user may elect to play video data in a fast forward mode. Rather than retrieving all data of segments of a representation, web application 52 may determine locations of data of the representation corresponding to a temporal sub-sequence of the representation. The data of the temporal sub-sequence may correspond, for example, to a set of instantaneous decoder refresh (IDR) pictures of the representation.

There may be an approximate temporal duration between IDR pictures of a representation, e.g., 2 seconds, 10 seconds, or other approximate temporal durations. Moreover, IDR pictures may be encoded in an intra-prediction mode, and thus, web application 52 need not retrieve data other than the IDR pictures. Web application 52 may cause the IDR pictures to be displayed at the same frame rate at which video data of the representation would otherwise be displayed. However, because many frames of data between IDR pictures may be skipped, the resulting video data may be played back at an increased frame rate, thus achieving the desired trick mode.

Web application 52 may determine locations of the data for the temporal sub-sequence using various techniques. In some examples, web application 52 may analyze data of manifest file 66 to determine locations of the IDR pictures. The locations of the IDR pictures may be indicated using byte ranges within segments of a particular representation. In other examples, a particular box of segments of representations, such as a sub-fragment index box (also referred to as a sub-segment index box), may provide indications of the locations of the data for the temporal sub-sequence. For example, the sub-fragment index box may include data representative of byte ranges for IDR pictures within a corresponding segment. In still other examples, both manifest file 66 and representations 68 may include information used by web application 52 to retrieve data for a temporal sub-sequence. In any case, web application 52 may determine the byte ranges of the IDR pictures in the segments to construct partial GET requests for the IDR pictures, to avoid retrieving data that would not be used for decoding or display.

In some examples, encapsulation unit 30 may form segments such that IDR pictures are contiguous within the segments. That is, encapsulation unit 30 may ensure that bytes of segments corresponding to IDR pictures are contiguous, without intervening bytes for other types of pictures. In this manner, web application 52 need only specify a single byte range of segments of a representation to retrieve data for a temporal sub-sequence of the representation. In some examples, open decoder refresh (ODR) pictures may also be used for performing trick modes.

In some examples, web application 52 may determine that a portion of a received segment indicates that a manifest file is to be updated. Web application 52 may be configured to analyze a particular portion of each segment, such as a header portion or other initial portion of the segment, to determine whether the segment indicates that the manifest file is to be updated. When a segment indicates that the manifest file is to be updated, web application 52 may update a locally stored copy of the manifest file, either using data of the segment or by retrieving data to update the manifest file from a remote location, e.g., from server 60. After updating the manifest file, web application 52 may submit future requests for data of representations 68 based on data of the updated manifest file.

As an example, content preparation device 20 may encode live media data, such as a live sporting event, political event, or other newsworthy event that is typically broadcast live or nearly live, rather than pre-recorded. In such cases, segments corresponding to media data up to a particular time may be assigned identifiers, such as URLs, included in an initial manifest file. However, after a period of time has elapsed, segments following the particular time may be encoded and assigned identifiers such as URLs. Encapsulation unit 30 of content preparation device 20 may provide the URLs for the segments following the particular time to an updated manifest file. Accordingly, to determine how to retrieve the segments following the particular time, client device 40 may receive information indicative of the updated manifest file, in order to construct requests to retrieve the segments following the particular time.

In some examples, a segment may indicate whether it is the last segment of a representation. When a segment is the last segment of a representation, a new manifest file may need to be retrieved to determine representations of a subsequent period of corresponding multimedia content. Accordingly, when web application 52 determines that a segment is the last segment of a representation in a period of the multimedia content, web application 52 may retrieve an updated manifest file for the multimedia content, e.g., an updated version of manifest file 66 of multimedia content 64.

In some examples, client device 40 may maintain a data structure indicative of particular representations 68 from which client device 40 requested data for multimedia content 64. Client device 40 may also maintain indications of exactly what was played out, and at what time. That is, the data structure may provide information representative of start and end times in both real (or "wall clock") time and presentation time. The data structure may further provide information representative of an initial startup time and the start of playback. After finishing playback of multimedia content 64, client device 40 may send the data structure to server device 60 and/or content preparation device 20. Server device 60 and/or content preparation device 20 may use information received from client device 40 to determine more optimal ways of improving quality of experience, such as to reduce pauses in playback.

Network interface 54 may receive and provide data of segments of a selected representation to web application 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, web application 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, web application 52, and/or decapsulation unit 50 may comprise an integrated circuit, a microprocessor, and/or a wireless communication device, such as a cellular telephone.

Figure 2:
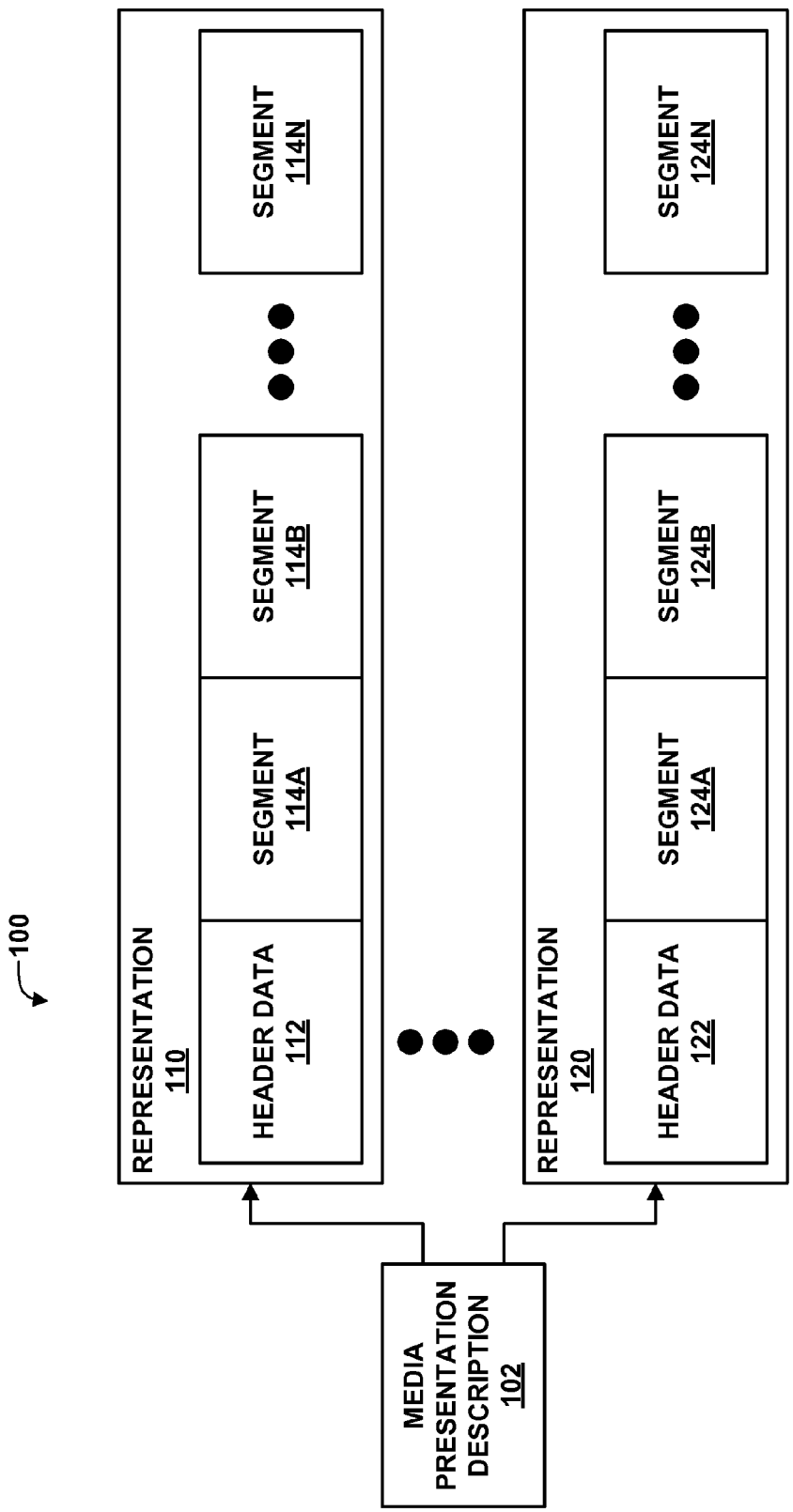
FIG. 2 is a conceptual diagram illustrating elements of an example multimedia content.

FIG. 2 is a conceptual diagram illustrating elements of an example multimedia content 100. Multimedia content 100 may correspond to multimedia content 64 (FIG. 1), or another multimedia content stored in memory 62. In the example of FIG. 2, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 102 may comprise a data structure separate from representations 110-120. MPD 102 may correspond to manifest file 66 of FIG. 1. Likewise, representations 110-120 may correspond to representations 68 of FIG. 1. In general, MPD 102 may include data that generally describes characteristics of representations 110-120, such as coding and rendering characteristics, representation groups, a profile to which MPD 102 corresponds, text type information, camera angle information, rating information, trick mode information (e.g., information indicative of representations that include temporal sub-sequences), and/or information for retrieving remote periods (e.g., for targeted advertisement insertion into media content during playback). Remote periods may also be referred to as external periods. FIGS. 4-7, discussed in greater detail below, illustrate various examples of multimedia content with various elements included in either or both of an MPD and/or representations (such as within segments of representations or header data of representations). Any or all of the MPDs of FIGS. 4-7 may correspond substantially to MPD 102 of FIG. 2.

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 2. MPD 102 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial Get requests to retrieve specific byte ranges of segments 114 or 124.

As noted above, MPD 102 may conform to a particular MPD profile. MPD 102 may include information indicative of a Multipurpose Internet Mail Extension (MIME) type for MPD 102 and/or multimedia content 100. MIME types generally do not indicate what codec is needed to present multimedia content, however. In general, it is assumed that if a device can retrieve an MPD for multimedia content, such as MPD 102, that the device can playback data of the multimedia content corresponding to the MPD. However, this assumption may not always be safe. Therefore, in some examples, MPD 102 may include information indicative of a profile to which MPD 102 corresponds.

There may be a relatively small number of profiles to which MPDs may correspond. Profiles may be supported by levels to address capabilities, similar to the manner in which H.264/AVC includes profiles and levels for video coding. MPD profiles may be onion-shelled, in that a higher profile may include all features of all lower profiles. There may be a registration process with a registration authority to register various profiles. In some examples, a client device, such as client device 40, may be configured to retrieve information indicative of the profile for the MPD, such as MPD 102, before retrieving other data of the MPD, such as characteristics of representations 110-120 signaled by MPD 102. In this manner, the profile for MPD 102 may be signaled before access to MPD 102 is provided.

A profile identifier may be provided in plain text (e.g., as a plain name), or a reversed domain name. Plain names may be reserved by a registration authority, such as 3GPP or another registration authority. A profile may be considered a claim and a permission, in that the profile may claim that a corresponding multimedia content conforms to the profile and gives permission to a reader (e.g., a client device) that implements that profile to read the MPD, interpret what it recognizes, and ignore material that it does not understand.

Profiles may describe characteristics such as, for example, features of MPD 102, usage of the network, media format(s), codec(s) used, protection formats, and/or quantitative measures such as bitrates, screen sizes, and the like. In this manner, the profile of MPD 102 may provide information indicative of what codecs need to be supported in order to retrieve data of MPD 102 and/or multimedia content 100. Profiles may also be described as "conformance points." Profiles with which an MPD complies may be indicated in a "Profiles" attribute of the MPD. Thus, a client device may be configured to retrieve a portion of MPD 102 including information relating to the "Profiles" attribute before retrieving additional data of MPD 102. Alternatively, profiles may be indicated as a parameter in the MIME type of the MPD. For example, profiles "X, Y, and Z" may be signaled in the following fashion:

video/vnd.mpeg.mpd;profiles="X,Y,Z."

In some examples, MPD 102 may refer to data of external periods (also referred to as remote periods). A period generally corresponds to a particular temporal section of multimedia content. Each period may include one or more representations, such as representations 110-120. An external period, however, may be inserted within or between periods of multimedia content 100. The external period may include multimedia data in addition to multimedia data of the multimedia content. For example, external periods may include advertisement data.

Periods may be defined by their duration, that is, the start time of the Period may depend on the duration of the previous Period. A client device may map external periods to an MPD structure. For live services, concatenation of MPDs may be achieved by a dynamic creation of the MPD on the server, such as server device 60, with appropriate update procedures. Other web technologies may also be used. URLs for externally defined periods may be processed in real-time to generate a new period containing advertisements targeted to a user of client device 40. Client device 40 may supply additional information with the request that may be used for advertisement targeting, for example, a user identifier, user preferences, user demographic information, or other information.

Table 1 below illustrates an example set of information that may be provided in MPD 102 to describe one or more Periods of multimedia content, and to indicate the presence of external periods:

TABLE 1

| MPD Period Information | | | | |
|---|---|---|---|---|
| Period | E | 1 ... N | M | Provides the information of a Period |
| PeriodAttributes | List | | M | already existing period attributes |
| periodDuration | A | | O | Provides the period duration, may be used as alternative to start attribute of next Period. |
| representationGroupListURI | A | | O | URI that points to a document that contains a list of Representations. |
| RepresentationGroups | E | 0 ... N | | This element contains a description of a Representation Group |
| periodListURI | A | | M | URI that points to a document that contains one or several Period elements. |

In this manner, the Period element of MPD 102 may refer to external (or remote) periods, e.g., using periodListURI. For On-Demand content, indications of period durations may be more useful for client devices, such as client device 40, than start times to support external periods. An MPD may include a sequence of Periods, where Periods can be internal or external. Using such remote Periods, along with user-specific information, may allow for targeted user advertising. Server device 60 and/or content preparation device 20 may be configured to dynamically generate separate MPDs for each user, or for each client device. Client device 40, or another device, may concatenate the playout of a targeted advertisement and a live service, e.g., using the dynamically-created MPD.

In this manner, the techniques of this disclosure may support situations in which a service provider offers On-Demand content through 3GPP AHS. The content may include several scenes, and between each scene, an advertisement may be added. The advertisement may differ for each user. That is, targeted advertising may be added. In addition, each advertisement may be of a different duration. Likewise, a service provider may offer a particular live service (e.g., a free service). When accessing the live service, the service provider may add an advertisement that may or may not be targeted to a user. The duration of the advertisement may differ, depending on access time, the access location, the user, and the like. Server device 60 may be configured to only provide the URL of the live service after the advertisement has been completed, to ensure that the advertisement is seen.

Figure 3:
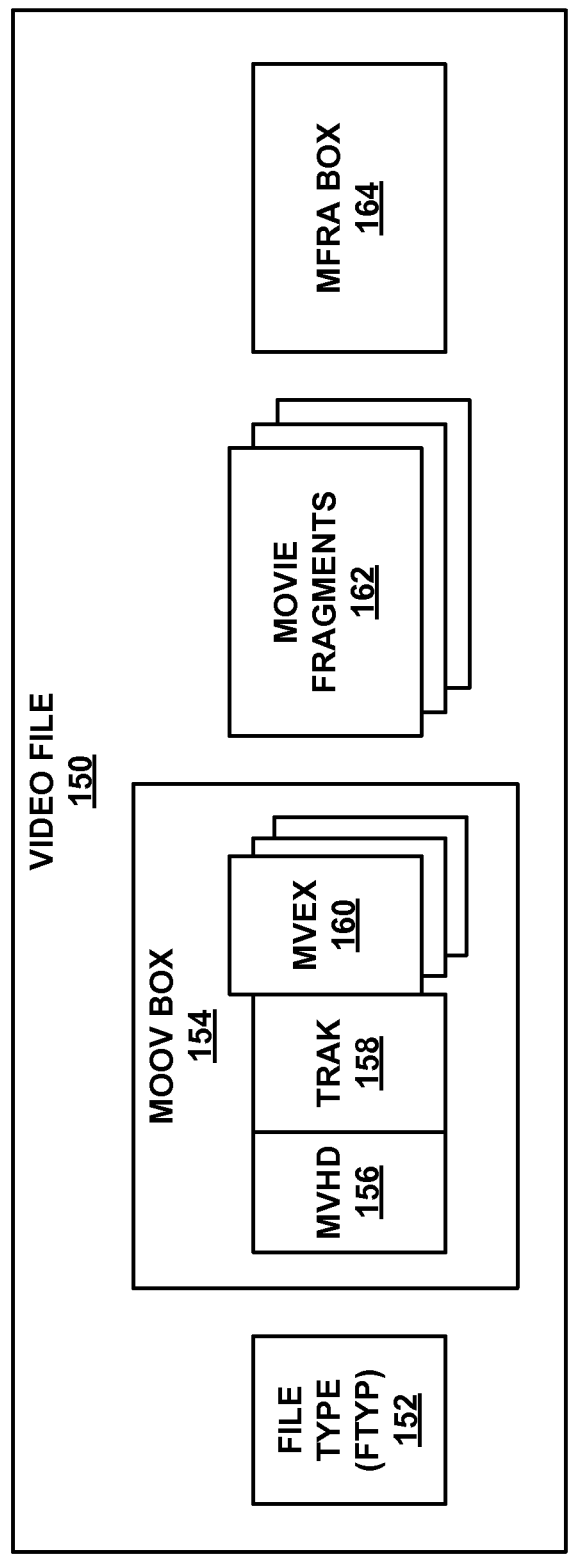
FIG. 3 is a block diagram illustrating elements of an example video file, which may correspond to a segment of a representation of multimedia content.

FIG. 3 is a block diagram illustrating elements of an example video file 150, which may correspond to a segment of a representation, such as one of segments 114, 124 of FIG. 2. Each of segments 114, 124 may include data that conforms substantially to the arrangement of data illustrated in the example of FIG. 3. Similarly, segments of FIGS. 4-7 discussed below may also conform substantially to the structure of video file 150. As described above, video files in accordance with the ISO base media file format and extensions thereof store data in a series of objects, referred to as "boxes." In the example of FIG. 3, video file 150 includes file type (FTYP) box 152, movie (MOOV) box 154, movie fragment (MOOF) boxes 162, and movie fragment random access (MFRA) box 164.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 164.

Figure 7:
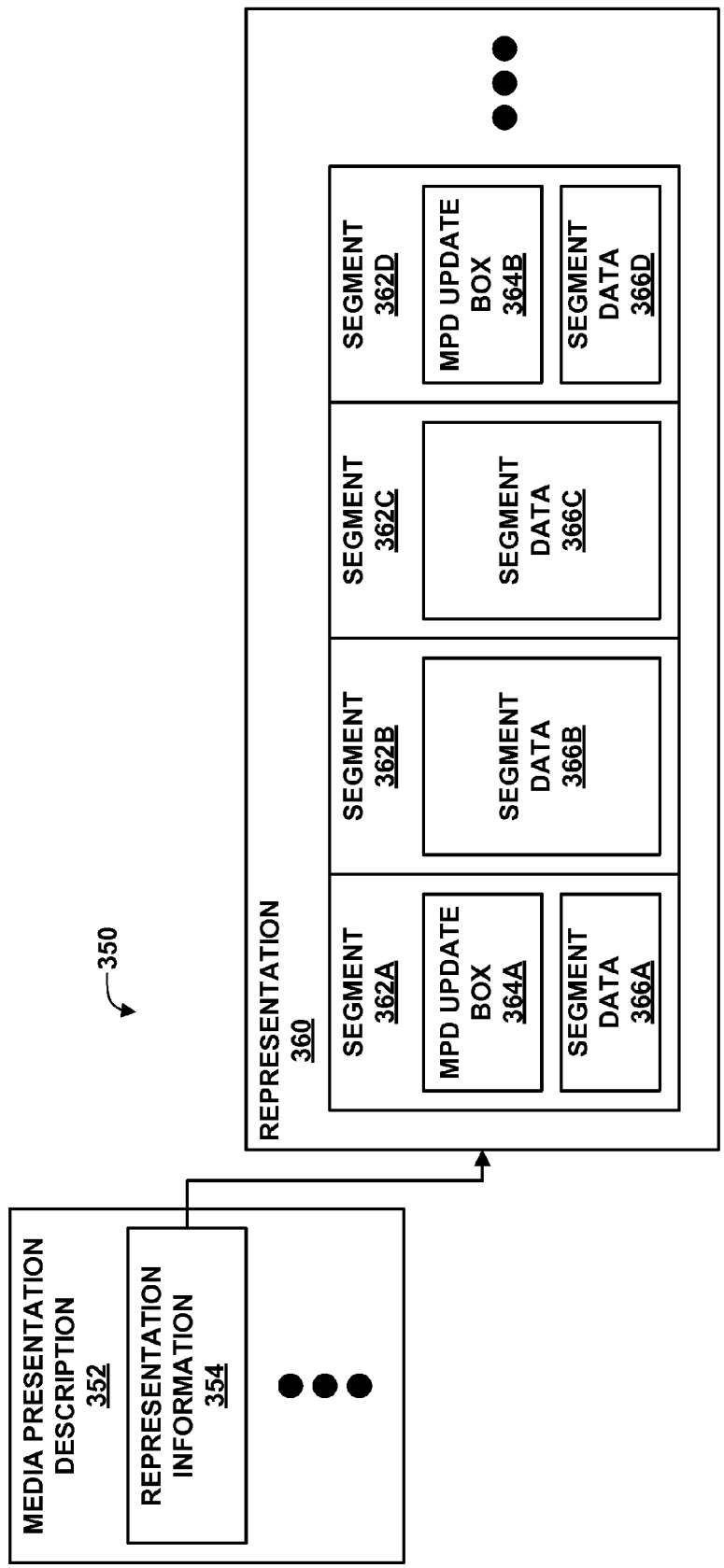
FIG. 7 is a conceptual diagram illustrating another example multimedia content in which segments may include MPD update boxes to indicate that an MPD of the multimedia content is to be updated.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 162, which may be referenced by data of TRAK box 158.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 162, e.g., to signal that video file 150 includes movie fragments 162, in addition to video data included within MOOV box 154, if any. In the context of streaming video data, coded video pictures may be included in movie fragments 162 rather than in MOOV box 154. Accordingly, all coded video samples may be included in movie fragments 162, rather than in MOOV box 154.

MOOV box 154 may include a number of MVEX boxes 160 equal to the number of movie fragments 162 in video file 150. Each of MVEX boxes 160 may describe characteristics of a corresponding one of movie fragments 162. For example, each MVEX box may include a movie extends header box (MEHD) box that describes a temporal duration for the corresponding one of movie fragments 162.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 162. Encapsulation unit 30 may further signal the presence of a sequence data set and/or sequence level SEI messages as being present in one of movie fragments 162 within the one of MVEX boxes 160 corresponding to the one of movie fragments 162.

Movie fragments 162 may include one or more coded video pictures. In some examples, movie fragments 162 may include one or more groups of pictures (GOPs), each of which may include a number of coded video pictures, e.g., frames or pictures. In addition, as described above, movie fragments 162 may include sequence data sets in some examples. Each of movie fragments 162 may include a movie fragment header box (MFHD, not shown in FIG. 3). The MFHD box may describe characteristics of the corresponding movie fragment, such as a sequence number for the movie fragment. Movie fragments 162 may be included in order of sequence number in video file 150.

MFRA box 164 may describe random access points within movie fragments 162 of video file 150. This may assist with performing trick modes, such as performing seeks to particular temporal locations within video file 150. MFRA box 164 is generally optional and need not be included in video files, in some examples. Likewise, a client device, such as client device 40, does not necessarily need to reference MFRA box 164 to correctly decode and display video data of video file 150. MFRA box 164 may include a number of track fragment random access (TFRA) boxes (not shown) equal to the number of tracks of video file 150, or in some examples, equal to the number of media tracks (e.g., non-hint tracks) of video file 150.

In some examples, movie fragments 162 may include one or more IDR and/or ODR pictures. Likewise, MFRA box 164 may provide indications of locations within video file 150 of the IDR and ODR pictures. Accordingly, a temporal sub-sequence of video file 150 may be formed from IDR and ODR pictures of video file 150. The temporal sub-sequence may also include other pictures, such as P-frames and/or B-frames that depend from IDR and/or ODR pictures. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence. Moreover, the data may be arranged in a continuous sub-sequence, such that a single byte range may be specified in a partial GET request to retrieve all data of a particular segment used for the temporal sub-sequence. A client device, such as client device 40, may extract a temporal sub-sequence of video file 150 by determining byte-ranges of movie fragments 162 (or portions of movie fragments 162) corresponding to IDR and/or ODR pictures. As discussed in greater detail below, video files such as video file 150 may include a sub-fragment index box and/or a sub-track fragment box, either or both of which may include data for extracting a temporal sub-sequence of video file 150.

Figure 4:
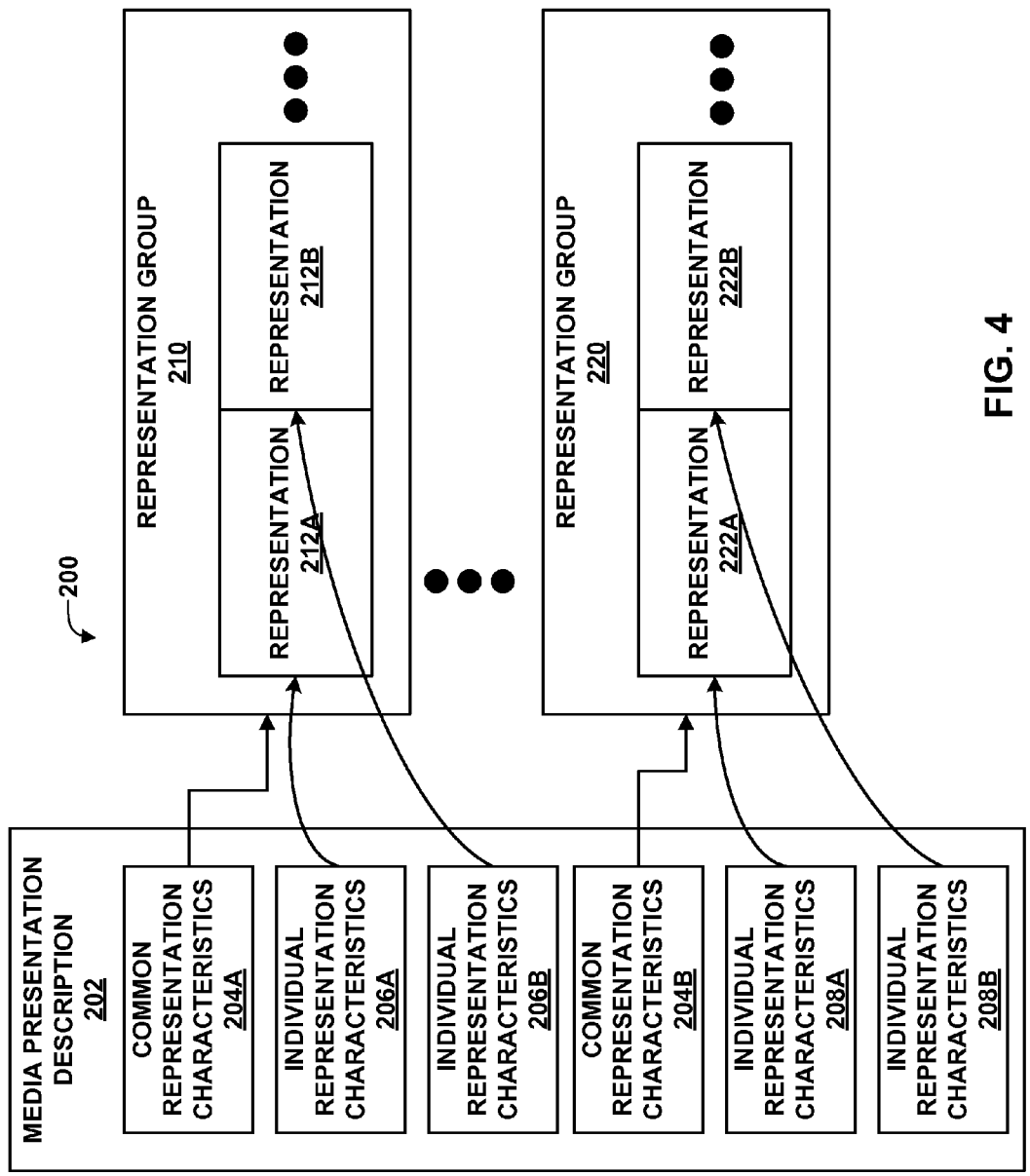
FIG. 4 is a conceptual diagram illustrating an example multimedia content including a media presentation description (MPD) and various representation groups.

FIG. 4 is a conceptual diagram illustrating an example multimedia content 200 including MPD 202 and representation groups 210-220. Multimedia content 200 may correspond to multimedia content 64 (FIG. 1), or another multimedia content stored in memory 62. In this example, representations of multimedia content 200 are arranged by representation group. That is, representations with a common set of characteristics may be formed into a representation group, which provides for simplified network bandwidth adaptation.

In this example, MPD 202 includes common representation characteristics 204A that includes information describing common characteristics of representation group 210 and common representation characteristics 204B describing common characteristics of representation group 220. The common characteristics may include coding and/or rendering characteristics of the representations, such as a codec, profile and level of the codec to which the representations in the representation conform, pixel resolution, frame rate, or other characteristics of representations.

In accordance with the techniques of this disclosure, the characteristics may include a text type value, a camera angle value, and/or a rating value in addition to the characteristics discussed above. The text type value may describe characteristics of text to be displayed with the video data (e.g., closed captioning text). The text type value may describe, for example, a language of the text, a location on the screen at which to display the text, font and/or size of the text, or other characteristics of the text.

The camera angle value may describe a real-world horizontal camera position for a camera used (either physically or conceptually) to generate coded video data of corresponding representations. Using the camera angles, a client device may select data from two or more representations to be displayed substantially simultaneously, e.g., to produce a three-dimensional video playback effect. The horizontal real-world camera locations may enable the client device to select representations to increase or decrease the relative amount of depth in the three-dimensional playback of the video data.

The rating may describe content suitability for particular audiences. For example, in the United States, the Motion Picture Association of America defines ratings including G, PG, PG-13, R, and NC-17. As another example, in the United Kingdom, the British Board of Film Classification defines ratings including U, PG, 12A, 12, 15, 18, and R18. As yet another example, in the Republic of China (Taiwan), categories of motion pictures include a general audiences category, a protected category, a parental guidance category, and a restricted category.

By providing common characteristics 204 of respective representation groups, e.g., representation groups 210-220, a client device (e.g., client device 40) may select an appropriate one of representation groups 210-220, based at least in part on the corresponding common representation characteristics 204. In the example of FIG. 4, MPD 202 also includes individual representation characteristics 206A, 206B, 208A, and 208B, corresponding respectively to representations 212A, 212B, 222A, 222B. Individual representation characteristics 206A, 206B, 208A, and 208B may include information representative of characteristics of representations 212A, 212B, 222A, 222B not indicated by common representation characteristics 204. For example, individual representation characteristics 206A, 206B, 208A, and 208B may include information representative of bitrates for respective ones of representations 212A, 212B, 222A, 222B.

Representations of a representation group may be considered mutually exclusive, in that they may represent the same content (same video, same language audio, etc.) with different encoding or other parameters. MPD 202 may provide information for selecting one of representation groups 210-220, e.g., common representation characteristics 204. This information may include information indicative of whether a client can decode and render a given representation. In this manner, the client device may remove from consideration representations that the client device is incapable of decoding and/or rendering. Accordingly, client device 40 may select a suitable representation group that can be decoded and rendered, then select a representation from the group based on, e.g., network bandwidth availability.

Client device 40 may also be configured with user preferences for, e.g., rating, language, and/or depth. Accordingly, client device 40 may also select one or more representation groups such that the selected groups conform to the user preferences. Client device 40 may then select a subset of available representation groups that can be played concurrently. When client device 40 is only capable of displaying one view, client device 40 may elect to retrieve data only from one representation. On the other hand, when client device 40 is stereo view or multiview capable, client device 40 may retrieve data from two or more representations.

After selecting one or more representation groups, client device 40 may select representations from the representation groups based on, e.g., available network bandwidth. As available network bandwidth changes (e.g., increases or decreases), client device 40 may adjust selections of representations from the representation groups to adapt to the changing network bandwidth conditions. Of course, client device 40 may also change representation selections if user preferences or device capabilities (e.g., decoding and rendering capabilities) change.

Common representation characteristics 204 may correspond to RepresentationGroup XML elements of MPD 202, in some examples. Individual representation characteristics may correspond to sub-elements of corresponding RepresentationGroup elements of MPD 202, in some examples.

By grouping common characteristics of representations together, various optimizations may be achieved. For example, many representations may have the same values for various parameters. Thus, individually signaling characteristics in the MPD may result in substantial duplication in the MPD to signal characteristics individually. Many client devices are configured to discard the vast majority of the MPD that is received. There could therefore be optimization in the portion of the MPD that the client device receives. Moreover, if a Representation Group is discarded, the client device may have no need to access information currently present in the MPD (URLs, etc.) for the discarded representation or representation group. The client device may also avoid unnecessary updates of URLs, which tend to be updated frequently during, e.g., real-time network streaming of video data for live events. Even if redundancies in the MPD were eliminated, client device 40 would still need to parse the full MPD after receipt and reconstruction, which may waste a significant amount of computing time.

Figure 5:
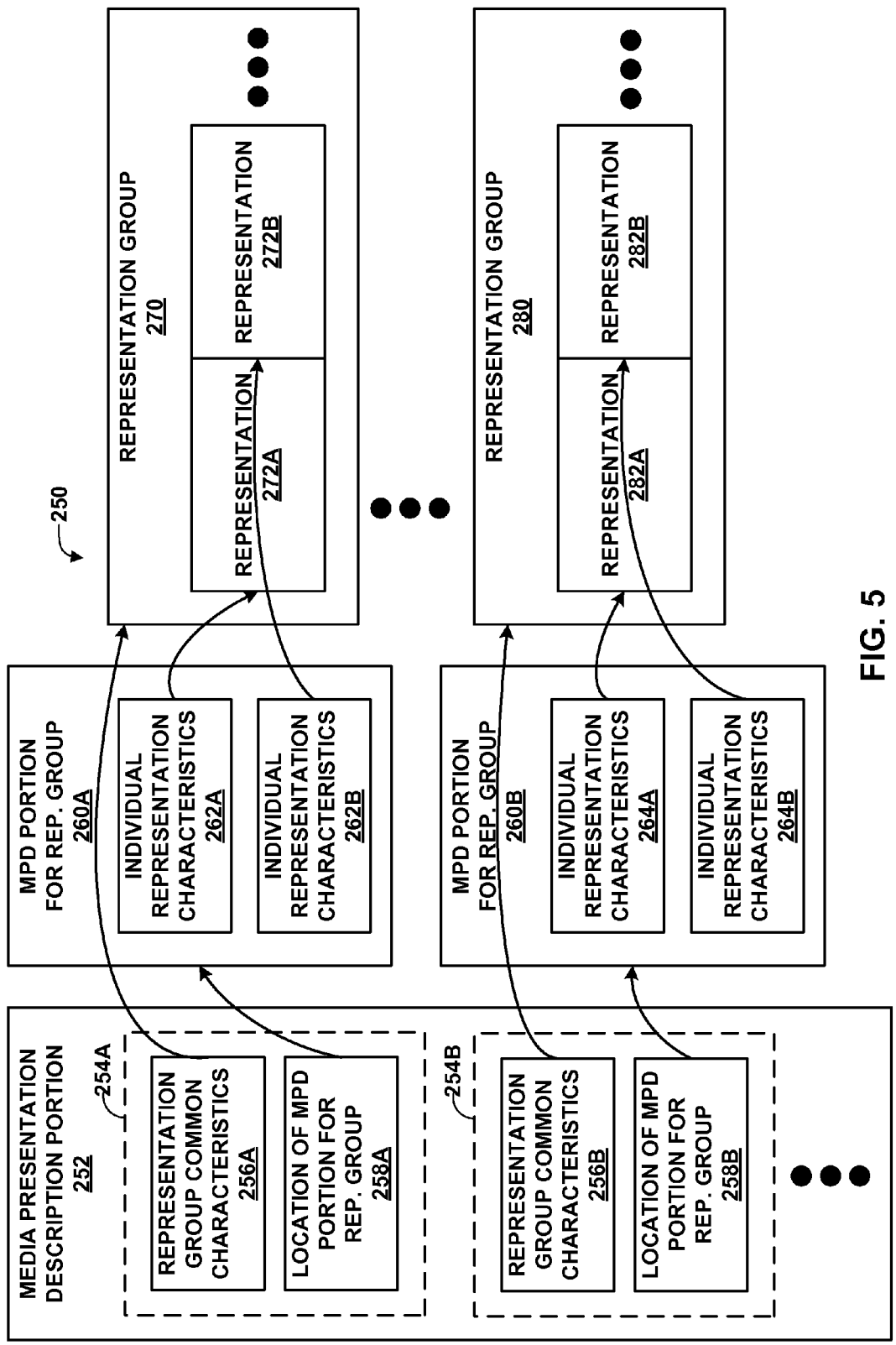
FIG. 5 is a conceptual diagram illustrating another example multimedia content, in which MPD data is separated into various portions for various representation groups.

FIG. 5 is a conceptual diagram illustrating another example multimedia content 250, in which MPD data is separated into various portions for various representation groups. Multimedia content 250 may correspond to multimedia content 64 (FIG. 1), or another multimedia content stored in memory 62. In particular, a manifest file for multimedia content 250 includes MPD portion 252, which generally includes data related to representation groups. In this example, MPD portion 252 includes representation group data 254A and 254B (representation group data 254), which corresponds to respective representation groups 270-280, as illustrated by arrows pointing from representation group data 254 to respective representation groups 270-280.

In this example, representation group data 254A includes representation group common characteristics 256A and location of MPD portion for the representation group 258A. That is, location of MPD portion for the representation group 258A indicates the location of MPD portion for representation group 260A. Location of MPD portion for the representation group 258A may correspond, for example, to a URI or URL of MPD portion for representation group 260A. Similarly, representation group data 254B includes representation group common characteristics 256B and location of MPD portion for the representation group 258B, corresponding to MPD portion for representation group 260B.

MPD portion for representation group 260A includes information representative of characteristics of specific representations 272A, 272B (representations 272) of representation group 270. Similarly, MPD portion for representation group 260B includes information representative of characteristics of specific representations 282A, 282B (representations 282) of representation group 280.

In this manner, a client device, such as client device 40, may determine an appropriate representation group from which to retrieve data, without receiving representation-specific signaling data for representations that client device 40 would not retrieve, decode, and display. Accordingly, client device 40 may avoid retrieving excess data that would otherwise just be discarded. In particular, after selecting one or more representation groups including representations that can be decoded and rendered by client device 40, client device 40 may retrieve only the MPD portions for the selected representation groups, without retrieving MPD portions for representation groups that could not be properly decoded and/or rendered by client device 40.

Data of multimedia content 250 may generally correspond substantially to respective elements of multimedia content 200. However, multimedia content 250 may simplify hierarchical download of MPD data for multimedia content 250 by client devices. For example, rather than retrieving a full manifest file, which may include signaling data for all representations, a client device may simply determine one or more representation groups, then retrieve the MPD portions corresponding to those representation groups, without retrieving MPD portions corresponding to other representation groups that would not be retrieved by the client device (e.g., because the client device does not support decoding and/or rendering procedures to decode and display the representations). In this manner, the data of multimedia content 250 may mitigate inefficiencies of unnecessary downloading and parsing.

Table 2 below provides an example element that can be added to an MPD, such as MPD 202 of FIG. 4 and/or MPD portion 252 of FIG. 5, that describes characteristics of representation groups. Common representation characteristics 204 (FIG. 4) and/or representation group common characteristics 256 may be formatted according to the structure of Table 2.

TABLE 2

| RepresentationGroup | E | 1 . . . N | M | This element contains a description of a Representation Group |
|---|---|---|---|---|
| RepresentationGroupAttri | List of Elements and Attributes | | | Describes the defaults for this group. may include profile information. |
| Representation | E | 0 . . . N | O | This element contains a description of a Representation. |
| RepresentationAttribut | List of Elements and Attributes | 0, 1 | O | Describes the Representation attributes that are specific for this Representation |
| representationListURI | A | 0 . . . N | O | URI that points to a document that contains a list of Representations. |

The XML below provides examples of Representation Group elements of an MPD data structure:
<RepresentationGroup annotation="ex0" annotation2="ex1">
<representationListURI="http://www.example.com/representations1.xml/> </RepresentationGroup>
<RepresentationGroup annotation="ex2" annotation2="ex3">
<representationListURI="http://www.example.com/representations2.xml/> </RepresentationGroup>

Table 3 below provides an example set of data that may be included for representations. This data may be provided for individual representations in some examples, while in other examples, all or a portion of the data may be provided for representation groups, according to, e.g., Table 2 above.

TABLE 3

| Representation | E | 1 . . . N | M | This element contains a description of a Representation. |
|---|---|---|---|---|
| bandwidth | A | | M | The minimum bandwidth of a hypothetical constant bitrate channel in bits per second (bps) over which the representation can be delivered such that a client, after buffering for exactly minBufferTime can be assured of having enough data for continuous playout. |
| texttype | A | | O | identifies the type of the text. Options are: sub-title closed-captioning <other to be identified> |
| cameraangle | A | | O | provides the camera angle. Pure annotation, e.g. main, mid-field, players view |
| Rating | E | 0 . . . N | | provides rating information |
| SchemeInformation | E | 0, 1 | O | This element gives the information about the used rating scheme. The element can be extended to provide more scheme specific information. |
| schemeIdUri | A | | O | Provides an absolute URL to identify the scheme. The definition of this element is specific to the scheme employed for rating. |

In some examples, data for representation groups and data for individual representations within such groups may be presented within an MPD, such as MPD 202, with a hierarchical relationship. That is, individual representations may be signaled as child elements to a corresponding representation group element of, e.g., MPD 202. Likewise, for MPD portion 252 and MPD portions for representation groups 260, individual representation characteristics 262, 264 may correspond to child elements of representation group common characteristics 256.

Figure 6:
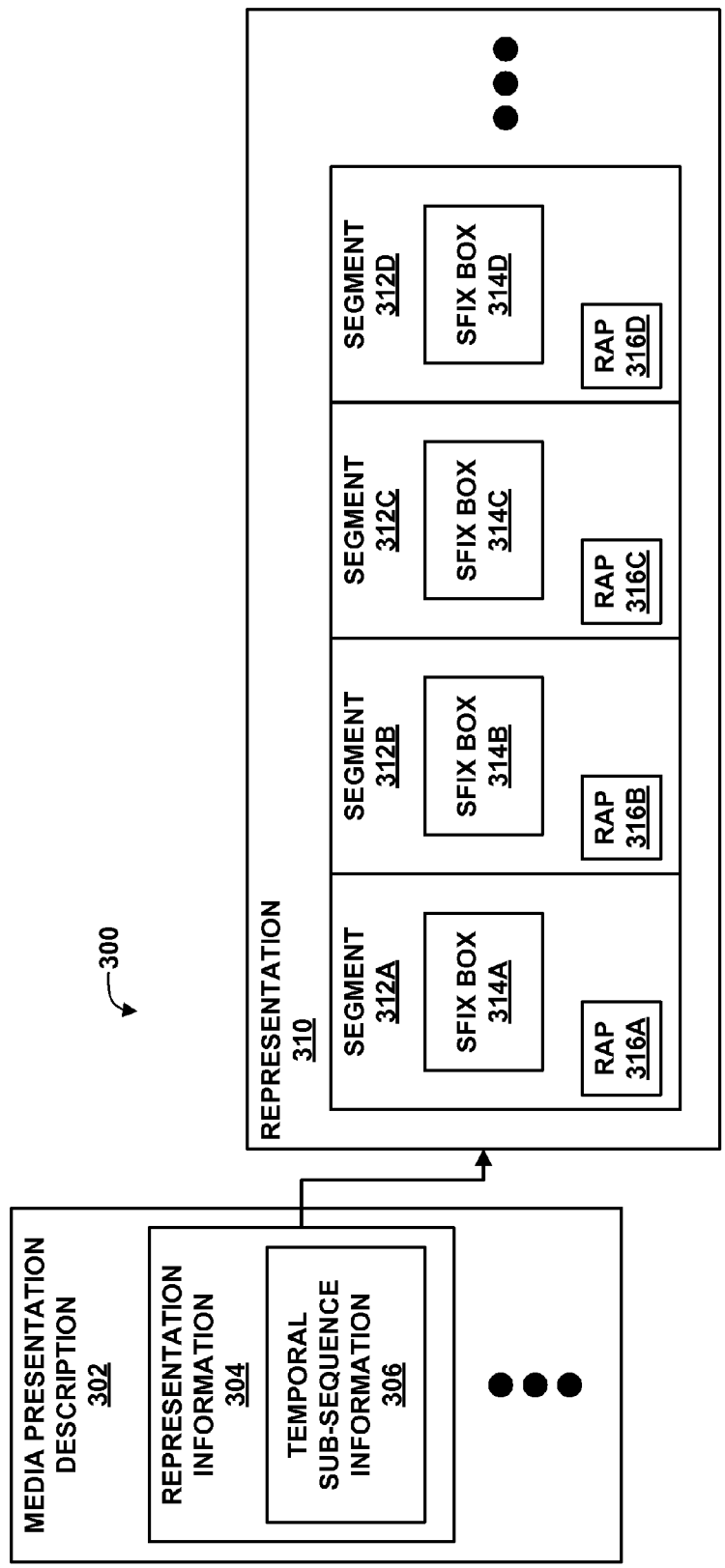
FIG. 6 is a conceptual diagram illustrating another example multimedia content that may be used to support trick modes.

FIG. 6 is a conceptual diagram illustrating another example multimedia content 300 that may be used to support trick modes. Multimedia content 300 may correspond to multimedia content 64 (FIG. 1), or another multimedia content stored in memory 62. In this example, MPD 302 includes representation information 304, which may include temporal sub-sequence information 306. Representation information 304 includes characteristics of representation 310, in this example. Representation 310 includes segments 312A-312D (segments 312). In this example, each of segments 312 includes a respective sub-fragment index box 314 and random access point (RAP) data 316. In other examples, some segments may include no random access points, while some segments may include multiple random access points. Random access points may include IDR or ODR pictures.

Client device 40 may extract a temporal sub-sequence from representation 310. For example, client device 40 may extract each of RAPs 316 to form a temporal sub-sequence of representation 310. Alternatively, client device 40 may retrieve a subset of RAPs 316, such as RAPs 316A and 316C, or 316A and 316D. By retrieving and playing back only random access points 316 (or subsets thereof), client device 40 may play representation 310 in a trick mode, e.g., fast forward or rewind. Similarly, client device 40 may skip or seek to a particular one of random access points 316 to begin playback from a requested temporal position.

Multimedia content may include either or both of temporal sub-sequence information 306 and/or SFIX boxes 314 to indicate information for trick modes. Temporal sub-sequence information 306 may include a "Trick Mode" element of MPD 302, such as that defined by Table 4 below:

TABLE 4

| | | | | |
|---|---|---|---|---|
| TrickMode | E | 0, 1 | O | Provides the information for trick mode. It also indicates that the Representation may be used as a trick mode Representation. |
| alternatePlayoutRate | A | | O | Specifies the maximum playout rate as a multiple of the regular playout rate, which this Representation supports with the same decoder profile and level requirements as the normal playout rate. |
| TemporalSubSequence | E | 0 . . . N | O | Specifies that this Representation contains a temporal sub-sequence that can be easily accessed by byte ranges using the information of the Sub-Fragment Index ('sfix) Box. |
| frameRate | A | | M | Specifies the frame rate of the temporal sub-sequence. |
| bandwidth | A | | O | Specifies the minimum bandwidth of a hypothetical constant bitrate channel in bits per second (bps) over which the temporal sub-sequence can be delivered such that a client, after buffering for exactly minBufferTime can be assured of having enough data for continuous playout. |
| alternatePlayoutRate | A | | O | Specifies the maximum playout rate as a multiple of the regular playout rate, which this temporal sub-sequence supports with the same decoder profile and level requirements as the normal playout rate. |

In the example of Table 4, the Trick Mode element includes a Temporal SubSequence element that specifies that a corresponding representation contains a temporal sub-sequence that can be accessed by byte ranges using information of sub-fragment index boxes 314. RAPs 316 may correspond to portions of movie fragments, such as movie fragments 162 illustrated in FIG. 3.

Sub-fragment index boxes 314 may generally describe byte range locations of random access points 316 of corresponding segments 312. In general, sub-fragment index boxes 314 may appear after a segment index (SIDX) box (not shown in FIG. 6) of segments 312 and provide movie fragment prefix sizes for movie fragments referenced in the immediately preceding segment index box. Table 5 below provides properties of an example SFIX box.

TABLE 5

| Sub-Fragment Index Box Properties | |
|---|---|
| Box Type | SFIX |
| Container | None |
| Mandatory | No |
| Quantity | One per Segment Index Box |

The pseudocode below provides an example syntax for Sub-Fragment Index Boxes 314:

```
aligned(8) class SubFragmentIndexBox
extends FullBox('strf', 0, 0) {
    unsigned int(32) fragment_count;
    unsigned int(8) sub_fragment_count;
    for( i=0; i < fragment_count; i++ )
        for( j=0; j < sub_fragment_count-1; j++ )
            unsigned int(32) prefix_size;
}
```

The description below provides an example set of semantics for the syntax described above:

fragment_count specifies the number of fragments for which sub-fragment information is specified in this box. This must be equal to the number of fragment references in the immediately preceding Segment Index Box.

sub_fragment_count specifies the number of sub-fragments per fragment prefix_size specifies the size of the prefix of fragment i occupied by sub-fragment j.

In addition, or in the alternative, a sub-track fragment box may be included in segments 312. Whereas the sub-fragment index box may provide syntax information that can be retrieved by client device 40 along with a segment index box in advance of requesting media data, the sub-fragment index box may provide information for client device 40 to construct byte range requests which target subsets of fragment data, for example, temporal sub-layers.

The Sub-Track Fragment box may specify a re-ordering of the sample data of the track fragment, such that the samples of each sub-track fragment precede all samples that appear only in higher sub-track fragments. Samples of a sub-track fragment that do not appear in any lower sub-track fragment may be placed contiguously within the file (e.g., a corresponding one of segments 312) in the same order as they appear in the Track Run box. This may allow for samples to be stored in order of temporal scalability layer within the track fragment. When this box is present there may be only one Track Run box.

Table 6 describes properties of the sub-track fragment box:

TABLE 6

| Sub-Track Fragment Box Properties | |
|---|---|
| Box Type | STRF |
| Container | Track fragment box ("TRAF") |
| Mandatory | No |
| Quantity | Zero or one |

The pseudocode below illustrates an example syntax for the sub-track fragment box:

```
aligned(8) class SubTrackFragBox
extends FullBox('strf', 0, 0) {
    unsigned int(8) sub_track_count;
```

```
        unsigned int(16) sample_count[sub_track_count-1];
        for( i=0; i < sub_track_count; i++ )
        {
            for (j=0; j < sample_count[i]; j++ )
                bit(1) cur_sub_trak_flag;
        }
        reserved_trailing_bits;
    }
```

The description below provides example semantics for the example syntax of the sub-track fragment box described above:
  sub_track_count indicates the number of sub-track fragments; When this box is present, the sub_track_count can be equal or larger than 2.
  sample_count[i] indicates the number of samples in sub-track fragment with an index of i+1. Samples of a sub-track fragment are considered to be members of all sub-track fragments with smaller index values. The number of samples in sub-track fragment 0 is equivalent to the number of zeros of the first bitstring in the subsequent loop. The number of samples in sub-track fragment with an index of sub_track_count−1, which is sample_count[sub_track_count−1], is equal to the number of samples in the Track Fragment.
  cur_sub_track_flag equal to 1 in the iteration i of the outer loop indicates that a sample belongs to sub-track fragment with an index of i+1. This value equal to 0 in the iteration of the outer loop indicates that a sample belongs to a sub-track fragment with an index smaller than i+1. Note: That is, the first iteration of the loop contains sample_count[0] flags indicating the positions of the samples in sub-track-fragment 1 that are not also in sub-track-fragment 0. The second iteration of the loop contains sample_count[1] flags indicating the positions of the samples in sub-track-fragment 2 and not also in sub-track-fragment 1 etc. sample_count [sub_track_count−1] is considered equal to the number of samples in the Track Fragment.

Trick modes may be applied to a variety of different scenarios. For example, trick modes may be used to pause a service temporarily, resume service after a pause, rewind for a period of time, and/or fast forward to proceed to a desired temporal position (e.g., after playback gets interrupted or to seek to a particular desired temporal position).

Supporting trick modes using temporal subsequences may provide a number of advantages. For example, temporal subsequences may support various frame rates relatively easily. Likewise, the representation including a temporal subsequence may be used for regular playout, as the representation is not limited to the temporal subsequence. Furthermore, encoding with temporal subsequences may be highly efficient. Temporal subsequences also need not require any new coding profiles or levels, can re-use the regular representations, avoid additional client complexity, enable simple content provisioning, provide bandwidth, cache, and storage efficiency, provide flexibility to the client implementation to optimize user experience, to be common among different trick mode operations, and can be applicable to a broad spectrum of client implementations, and can provide relatively good user experience in terms of start-up delay after seeking, as well as good frame rates, reactiveness, and other such metrics.

FIG. 7 is a conceptual diagram illustrating another example multimedia content 350 in which segments 362A-362D may include MPD update boxes 364 to indicate that MPD 352 is to be updated. Multimedia content 350 may correspond to multimedia content 64 (FIG. 1), or another multimedia content stored in memory 62. In general, MPD 352 includes representation information 354 for representation 360, such as characteristics of representation 360 and URIs or URLs of segments 362 of representation 360. In some cases, representation 360 may be formed from live content, e.g., a sporting event, and therefore, URIs of segments 362 might not be determined in advance. Therefore, as segments of representation 360 are formed, one or more of the segments may include MPD update boxes to indicate that MPD 352 is to be updated.

For example, in FIG. 7, segment 362A includes MPD update box 364 and segment data 366A. Segment data 366A may generally be formed according to video file 150 (FIG. 3). However, segment 362A also includes MPD update box 364A. In this manner, client device 40 may update MPD 352 based on data of MPD update box 364A. MPD update box 364A may include updates to MPD 352, or may include a URI or URL of an update for MPD 352. It should be understood that data of MPD update boxes 364 is not necessarily included in explicit boxes. For example, data that conforms substantially to the data of MPD update boxes 364 may be included in other boxes of segments 362, or in a header portion of segments 362. In this manner, a "portion" of segments 362 that includes MPD update information may correspond to a header portion, an MPD update box similar to MPD update boxes 364, or data included in one or more other boxes of segments 362.

In this manner, after retrieving data of segment 362A, client device 40 may analyze MPD update box 364A to update MPD 352. Client device 40 may then use the updated version of MPD 352 to retrieve segments 362B and 362C. Segments 362B and 362C include segment data 366B, 366C, which again may be formatted according to video file 150 of FIG. 3. Client device 40 may also retrieve data of segment 362D. In this example, segment 362D includes MPD update box 364B, which client device 40 may use to perform another update to MPD 352, in a manner that conforms substantially to the first update. Accordingly, to receive segments beyond segment 362D of representation 360, client device 40 may use the newly updated version of MPD 352, based on updates performed with respect to data of MPD update box 364B.

An MPD update box, such as MPD update boxes 364A, 364B, may include properties according to Table 7 below:

TABLE 7

MPD Update Box Properties

| Box Type | MUPE |
|---|---|
| Container | None |
| Mandatory | No |
| Quantity | Zero or One |

The following syntax may be used to define an MPD update box, in some examples:

```
    aligned(8) class MPDUpdateBox
        extends FullBox('mupe') {
        unsigned int(3) mpd_information_flags;
        unsigned int(1) new_location_flag;
        unsigned int(28) latest_mpd_update_time;
```

-continued

```
/// The following are optional fields
string mpd_location
}
```

An example set of semantics for the example MPD update box syntax is provided below:

mpd_information_flags contains the logical OR of zero or more of the following:
  0x00 Media Presentation Description update now
  0x01 Media Presentation Description update ahead
  0x02 End-of-presentation
  0x03-0x07 reserved
new_location_flag if set to 1, then the new Media Presentation Description is available at a new location specified in mpd_location.
latest_mpd_update_time specifies the time in ms by when the MPD update is necessary relative to the MPD issue time of the latest MPD. The client may choose to update the MPD any time between now.
mpd_location is present if and only if the new_location_flag is set and provides a Uniform Resource Locator for the new Media Presentation Description.

In this manner, in-band signaling at the segment level may be used to indicate updates to MPD 302. Updates may be provided at segment boundaries, in some examples. That is, MPD update boxes 364 may occur only at the beginnings or at the ends of respective segments, in various examples. In some examples, if bandwidth of MPD updates presents an issue, server device 60 (FIG. 1) may offer MPDs for certain device capabilities, such that only these parts are updated. Moreover, an MPD element of MPD 302 may provide a publishing time in wall-clock time of MPD 302. This may provide a unique MPD publish time, which may provide unique identifier for the MPD and when the MPD was issued. It may also provide an anchor for the update procedures. Furthermore, server device 60 and/or content preparation device 20 may optimize MPD updates using hierarchical structures, e.g., to update only portions of MPD 302 that require updates, without changing other portions of MPD 302 that do not need updating.

Advertisement insertion, such as targeted advertisement insertion, may also be performed using MPD update boxes similar to those of FIG. 7. That is, an MPD update box may be provided to direct client device 40 to retrieve data from advertisement multimedia content. This may occur during timeouts or other actions in sporting events that delay play of the game, and likewise, in timeouts or delays of exciting action for video playback. Because such events may happen somewhat randomly, times at which advertisements are to be inserted might not be known a priori.

Updating of MPD 302 may be feasible in an asynchronous manner to the delivery of segments. Server device 60 may provide guarantees to client device 40 that an MPD will not be updated for a particular amount of time. However, server device 60 need not explicitly signal when the MPD is updated before a minimum update period. Completely synchronous playout may be hardly achieved, as client devices may operate on different MPD update instances. Therefore, clients may experience drift. Time-shift viewing may be provided for by server device 60 and/or content preparation device 20.

Figure 8:
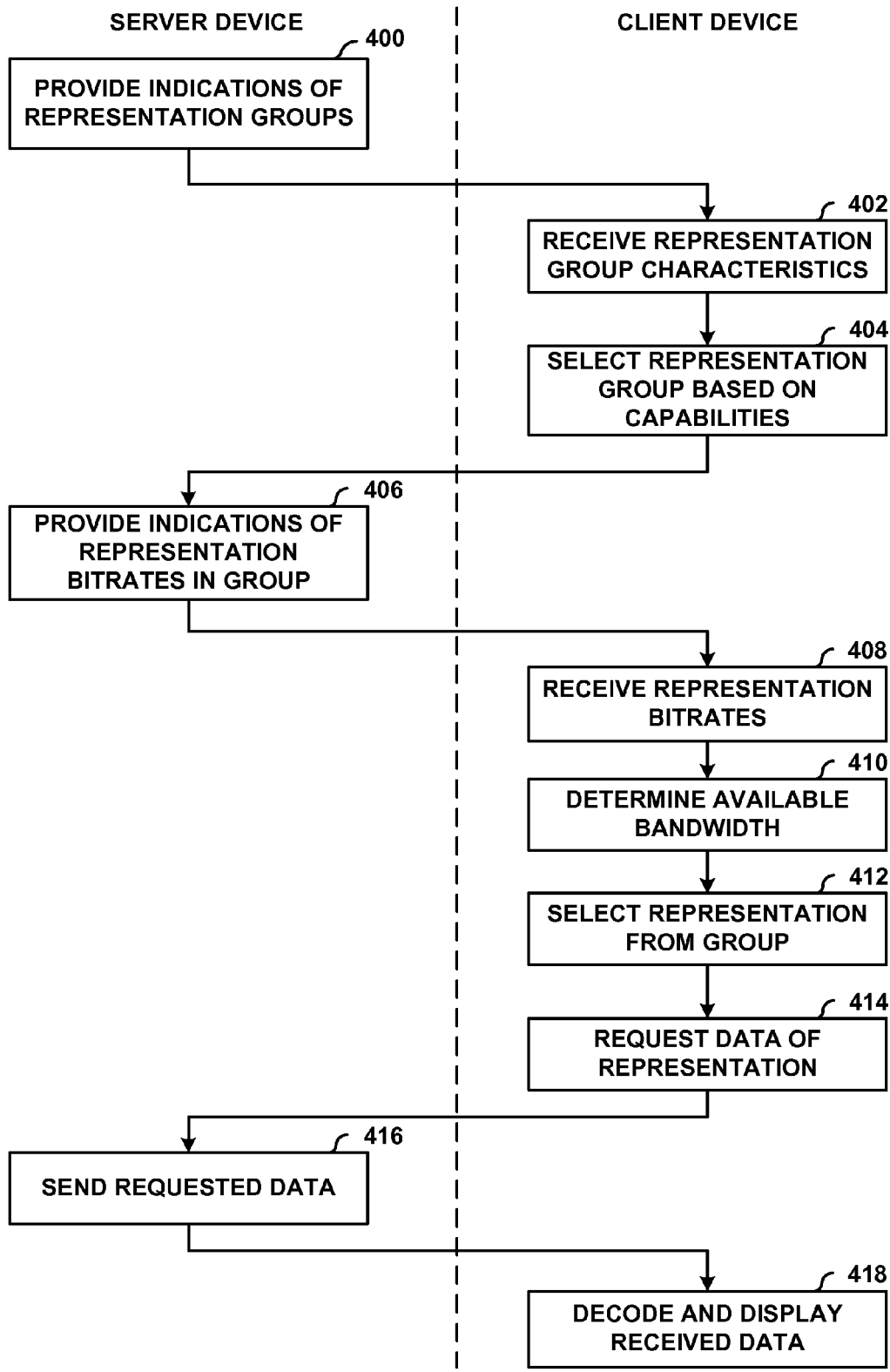
FIG. 8 is a flowchart illustrating an example method for providing indications of representation groups by a server device, and for selecting representation groups by a client device as well as an individual representation within the selected representation group.

FIG. 8 is a flowchart illustrating an example method for providing indications of representation groups by a server device, and for selecting representation groups by a client device as well as an individual representation within the selected representation group. Although the method of FIG. 8 is described with respect to server device 60 and client device 40, it should be understood that other devices may implement techniques similar to those of the method of FIG. 8. For example, content preparation device 20, or one or more network devices of a content delivery network, may perform some or all of the functions attributed to server device 60.

Server device 60 may initially obtain (e.g., create, or receive from content preparation device 20) data for a set of representations of multimedia content, where the representations in the set have one or more common characteristics, as well as a manifest file for the multimedia content. The set of representations may correspond to a representation group. Server device 60 may provide indications of representation groups to client device 40 (400). For example, server device 60 may provide MPD 202 (FIG. 4) or MPD portion 252 (FIG. 5) to client device 40. Other example MPDs of FIGS. 2, 6, and 7 may also include indications of representation groups, such as representation group XML elements. In any case, client device 40 may receive information describing representation group characteristics (402), e.g., from the MPD file or portion of the MPD file received from server device 60.

Client device 40 may then analyze the representation group characteristics to eliminate representation groups that client device 40 cannot or would not elect to retrieve, decode, or render. For example, client device 40 may compare decoding and rendering capabilities to characteristics of the representation groups to determine inappropriate representation groups. As another example, client device 40 may compare user preferences for language, rating, and amount of depth (e.g., as provided by two or more views having particular camera angles), to eliminate undesirable representation groups. Client device 40 may then select an appropriate representation group based at least in part on the decoding and rendering capabilities of client device 40 (404). Of course, it should be understood that this selection may also (additionally or alternatively) be made based on user preferences, as discussed above. In this manner, client device 40 may select a set of representations based on common characteristics for the set of representations.

After selecting a representation group, client device 40 may request data for an MPD portion that specifically describes representations of the representation group. In response, server device 60 may provide indications of representation bitrates, among other individual representation characteristics, in the selected representation group to client device 40 (406). For example, server device 60 may send data for a specific one of MPD portions for representation groups 260 (FIG. 5) to client device 40. In other examples, client device 40 may have already received a full MPD for the multimedia content (e.g., MPD 202 of FIG. 4), but may particularly analyze portions of the MPD corresponding specifically to the selected representation group. In this manner, in some examples, step 406 of FIG. 8 may occur prior to step 402 and/or step 404.

In any case, after receiving characteristics specific to representations of the selected representation group including bitrates for the representations (408), client device 40 may determine a currently available amount of network bandwidth (410). Client device 40 may then select a representation from the selected representation group (412), such that the selected representation has a bitrate that can be accommodated by the determined currently available amount of network bandwidth. The bitrates of the representations represent examples of coding characteristics of the individual representations in the representation group. Client device 40 may then request data of the selected representation (414). For example, client device 40 may construct (e.g., generate and send) an HTTP GET request to request a segment of the selected representation. Alternatively, client device 40 may construct an HTTP partial GET that specifies a byte range of a segment of the selected representation. In any case, client device 40 may submit the request to server device 60.

Server device 60 may receive the request, and in response, send the requested data to client device 40 (416). For example, request processing unit 70 may determine a network address of client device 40 from data of the received request, e.g., a source Internet protocol (IP) address and source port of the received request. Request processing unit 70 may form network packets including the requested data and send the requested data to client device 40, e.g., destined for the determined IP address of client device 40.

After receiving the requested data, client device 40 may begin decoding and displaying the received data (418). While receiving requested data, client device 40 may continue analyzing currently available network bandwidth and submitting requests from representations having bitrates that can be accommodated by the currently available amount of network bandwidth (410-414). If the amount of network bandwidth changes, client device 40 may adaptively switch to a different representation in the selected representation group. For example, client device 40 may determine a segment in a new representation corresponding to the temporal location of the last segment requested from a previous representation in the representation group, then request the determined segment (or a portion thereof) in the new representation.

In some examples, server device 60 may provide an MPD corresponding to targeted advertisement insertion to client device 40 during the method of FIG. 8. The MPD may cause client device 40 to retrieve advertisement multimedia data targeted to a user of client device 40. In some examples, client device 40 may further provide user information to server device 60 to target the advertisement media data to the user of client device 40. The user information may include user preferences, user identifying information (such as a user ID), user demographic information, or other such information. The targeted add insertion may occur, for example, prior to step 400 of FIG. 8, or after step 418 and before selecting a subsequent representation, e.g., for a subsequent period of the multimedia content.

In this manner, the method of FIG. 8 represents an example of a method including analyzing at least a portion of a manifest file for multimedia content, wherein the portion of the manifest file includes information indicative of sets of representations of the multimedia content and information indicative of common characteristics for each of the sets of representations, selecting one of the sets of representations based on the common characteristics for the one of the sets of representations, selecting one of the representations of the selected one of the sets of representations based on one or more coding characteristics of the one of the representations of the one of the sets, and generating a request for data of the one of the representations based on the selection.

Likewise, the method of FIG. 8 represents an example of a method including obtaining a set of representations of multimedia content having one or more common characteristics, wherein each of the representations in the set have individual coding characteristics separate from the common characteristics, obtaining a manifest file for the multimedia content, wherein the manifest file includes information indicative of the representations in the set, information indicative of the common characteristics for the set of representations, and information indicative of the coding characteristics for each of the representations in the set, and sending at least a portion of the manifest file to a client device.

Figure 9:
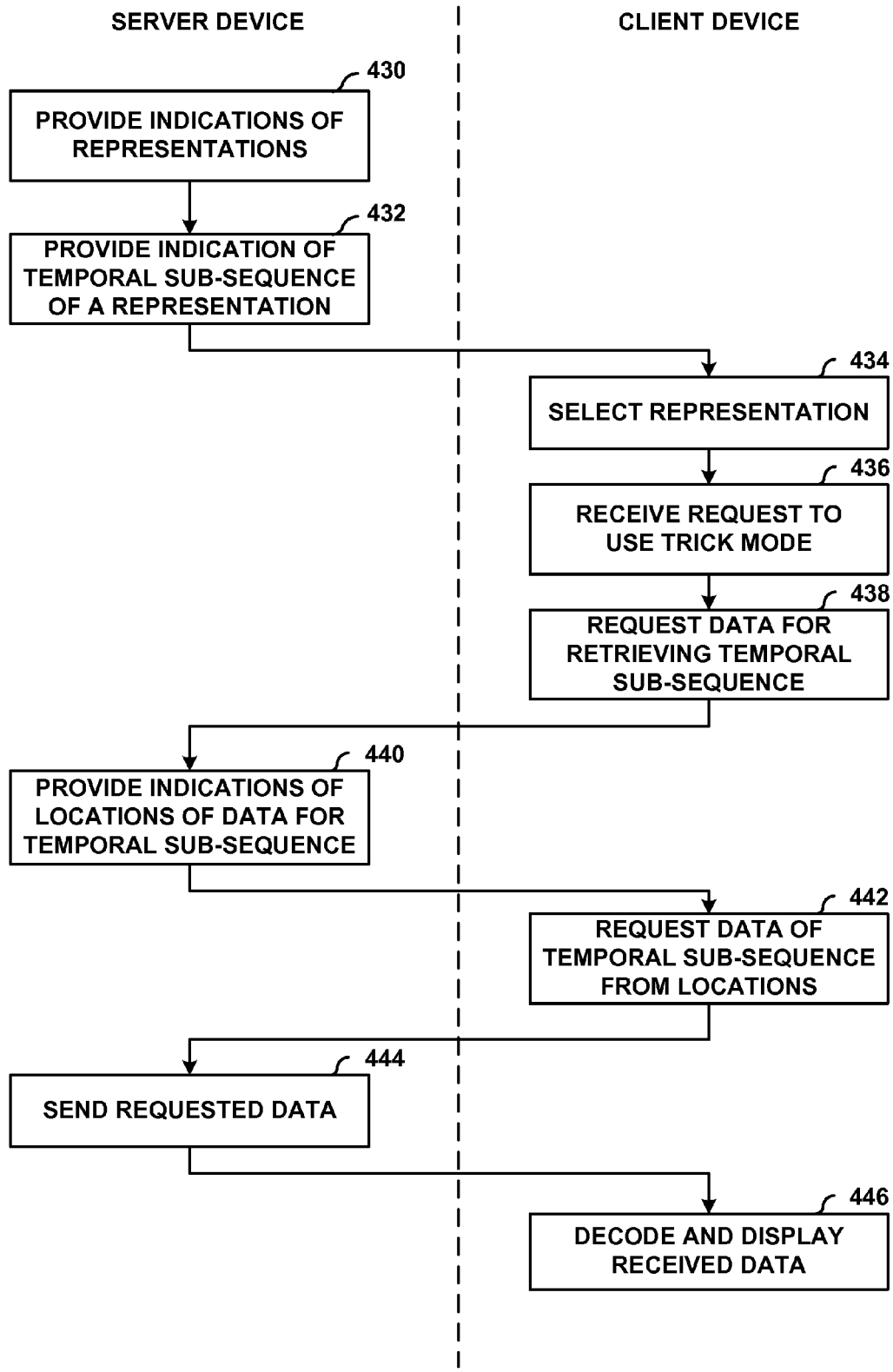
FIG. 9 is a flowchart illustrating an example method for providing data representative of a trick mode by a server device, and for using the data by a client device to retrieve and play trick mode data of multimedia content.

FIG. 9 is a flowchart illustrating an example method for providing data representative of a trick mode by a server device, and for using the data by a client device to retrieve and play trick mode data of multimedia content. Although the method of FIG. 9 is described with respect to server device 60 and client device 40, it should be understood that other devices may implement techniques similar to those of the method of FIG. 9. For example, content preparation device 20, or one or more network devices of a content delivery network, may perform some or all of the functions attributed to server device 60. Moreover, the selection of a trick mode may be performed in conjunction with selection of a representation group and a representation from the representation group, as described with respect to FIG. 8 above.

Server device 60 may initially obtain (e.g., create, or receive from content preparation device 20) data for one or more representations of multimedia content, where at least one of the representations includes a temporal sub-sequence, as well as a manifest file for the multimedia content. The manifest file may indicate that the representation includes a temporal sub-sequence. Server device 60 may provide indications of representations of multimedia content, e.g., characteristics of the representations (430) to client device 40. In addition, server device 60 may provide indications of temporal sub-sequences of one or more of the representations (432). That is, server device 60 may provide information in an MPD file for the multimedia content indicating that temporal sub-sequences are available for one or more representations of the multimedia content. For example, server device 60 may provide at least a portion of an MPD including a trick mode element having a temporal sub-sequence sub-element to client device 40, as described with respect to FIG. 6 above.

Client device 40 may select a representation based on characteristics of the representations of the multimedia content (434). Although client device 40 need not necessarily select a representation with a temporal sub-sequence, for purposes of discussion to illustrate these techniques, it is assumed for purposes of example that client device 40 selects a representation for which a temporal sub-sequence is available. Client device 40 may then receive a request to use a trick mode (436). For example, client device 40 may receive a selection of a particular temporal location from which to begin playback, e.g., from a user of client device 40. Alternatively, client device 40 may receive a request to fast forward or rewind the video data.

In response to the request to use the trick mode, client device 40 may determine whether a temporal sub-sequence for the representation is available, and if so, to request data for retrieving at least a portion of the temporal sub-sequence (438). Server device 60 may respond to the request by providing indications of locations of data for the temporal sub-sequence to client device 40 (440). In some examples, a portion of the MPD for the multimedia content may indicate locations of the data for the temporal sub-sequence. In other examples, client device 40 may request sub-fragment index boxes and/or sub-track fragment boxes from segments of the corresponding representation.

In any case, client device 40 may use the received data including information indicative of locations of data for the temporal sub-sequence to request data of the temporal sub-sequence from the specified locations (442). For example, client device 40 may determine locations (e.g., URLs of segments and, possibly, byte ranges of the segments) including IDR random access points and/or ODR random access points. Client device 40 may then construct HTTP GET or partial GET requests for data of the temporal sub-sequence, in order to play video data according to the trick mode.

After receiving the HTTP GET and/or partial GET requests from client device 40, server device 60 may provide the requested data to client device 40 (444). For example, server device 60 may send segments in response to HTTP GET requests or media fragments of segments (or portions of media fragments) in response to HTTP partial GET requests. After receiving the requested data, client device 40 may decode and display the received data (446). Likewise, client device 40 may continue requesting data from the representation (or a different representation if the amount of available network bandwidth changes).

In this manner, the method of FIG. 9 represents an example of a method including analyzing information of a manifest file for multimedia content, wherein the information of the manifest file indicates that at least one representation of the multimedia content includes a temporal sub-sequence, determining one or more locations of data for the temporal sub-sequence, and submitting one or more requests for the data for the temporal sub-sequence.

Likewise, the method of FIG. 9 represents an example of a method including obtaining data for at least one representation of multimedia content that includes a temporal sub-sequence, obtaining data for a manifest file for the multimedia content, wherein information of the manifest file indicates that the at least one representation of the multimedia content includes the temporal sub-sequence, and sending at least a portion of the manifest file to a client device.

Figure 10:
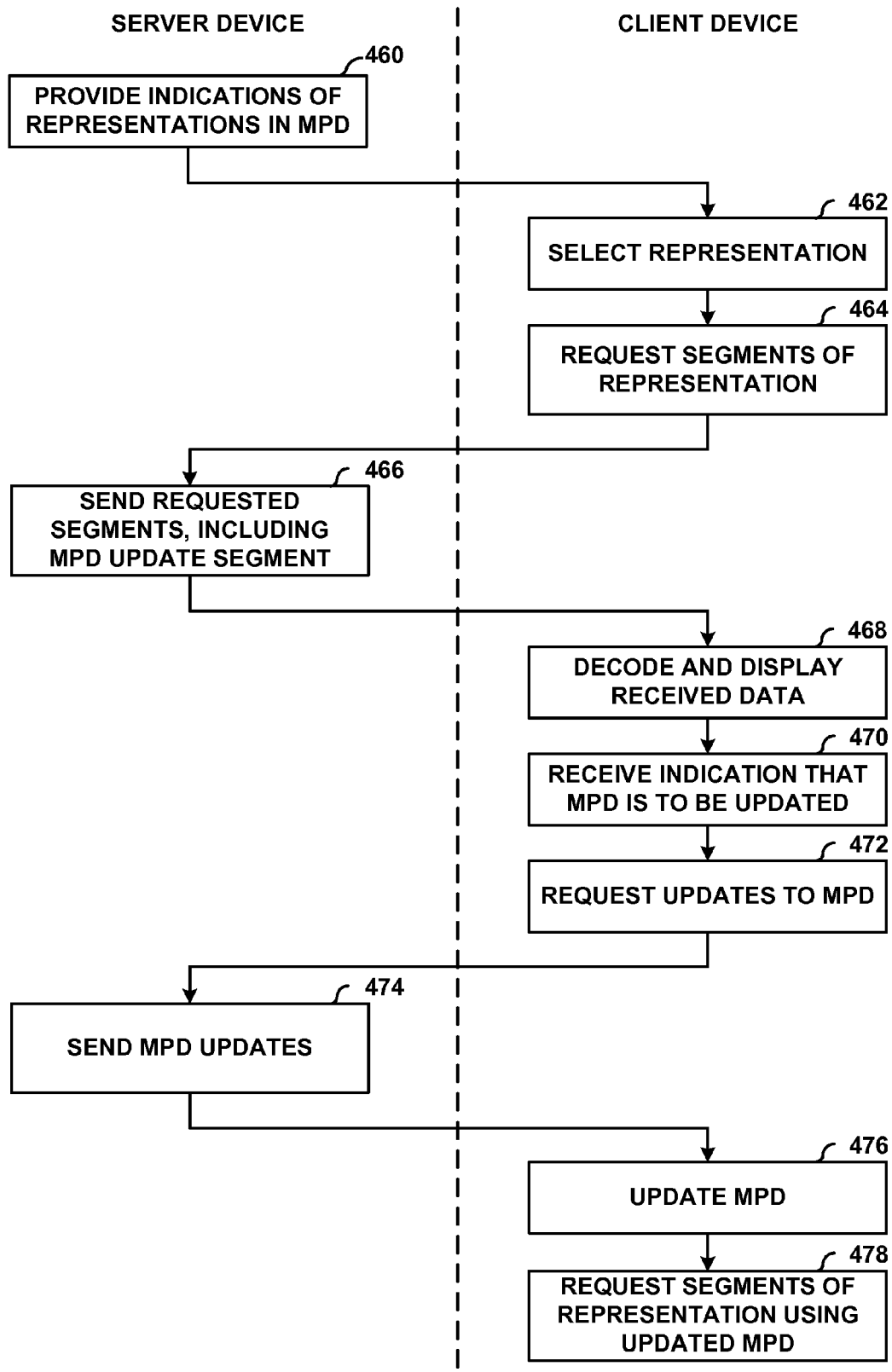
FIG. 10 is a flowchart illustrating an example method for providing, by a server device, indications that a manifest file, such as an MPD, is to be updated, and for updating an MPD by a client device.

FIG. 10 is a flowchart illustrating an example method for providing, by a server device, indications that a manifest file, such as an MPD, is to be updated, and for updating an MPD by a client device. Although the method of FIG. 10 is described with respect to server device 60 and client device 40, it should be understood that other devices may implement techniques similar to those of the method of FIG. 10. For example, content preparation device 20, or one or more network devices of a content delivery network, may perform some or all of the functions attributed to server device 60. Moreover, updating of an MPD may be performed in conjunction with selection of a trick mode and/or selection of a representation group and a representation from the representation group, as described with respect to FIGS. 8 and 9 above.

In some examples, content preparation device 20 may encode and encapsulate encoded video data captured during a live event, such as a sporting event. In this manner, client device 40 may retrieve coded data of the event in nearly real time as the event is occurring. Initially, server device 60 may receive one or more representations of multimedia content corresponding to the live event and provide indications of characteristics for representations of the multimedia content in an MPD (460). The MPD may only describe characteristics and locations of segments up to a particular temporal location of the multimedia content, due to the multimedia content being formed as the event is being filmed live.

Client device 40 may use the information of the MPD to select a representation (462). Using the current MPD, client device 40 may request segments of the selected representation, e.g., up to the temporal location. In response, server device 60 may send the requested segments. However, in addition, server device 60 may send a segment including an MPD update box or other information indicating that the MPD is to be updated as of that segment (466).

In response, client device 40 may decode and display data of one or more of the received segments (468). Client device 40 may also receive the information indicating that the MPD is to be updated (470). For example, client device 40 may receive the last segment before the temporal location at which the MPD no longer applies. Client device 40 may determine that the last segment includes an MPD update box, similar to the MPD update boxes described with respect to FIG. 7.

Using the update box, client device 40 may request updates to the MPD (472). For example, client device 40 may determine a network location of updates for the MPD and request the updates from the determined location. Server device 60, or another device storing updates to the MPD (e.g., content preparation device 20) may send information indicative of the updates to the MPD (474), which client device 40 may use to update the MPD (476). Alternatively, in some examples, the MPD update box may include information indicative of the MPD updates itself, in which case client device 40 may update the MPD using the information of the MPD update box. In any case, client device 40 may then request segments following the temporal location at which the previous MPD no longer applied, using the updated version of the MPD (478). Client device 40 and server device 60 may continue performing similar steps until client device 40 has finished playback of the multimedia content.

In some examples, techniques similar to the method of FIG. 10 may be used to perform targeted advertisement insertion. For example, an updated MPD may include a portion that corresponds to advertisement media content. Client device 40 may be required to retrieve and play back data of the advertisement media content, based on the updated MPD, in order to receive data of one or more segments of the advertisement media content, which may include another updated MPD for retrieving subsequent media data of the desired media content.

In this manner, the method of FIG. 10 represents an example of a method including retrieving data of a first segment of a representation of multimedia content in accordance with data of a copy of a manifest file stored by a client device, retrieving a portion of a second segment of the representation in accordance with the manifest file, wherein the second segment occurs after the first segment in the representation, and wherein the portion of the second segment indicates that the manifest file is to be updated, updating the copy of the manifest file stored by the client device based on the indication that the manifest file is to be updated, and retrieving media data of the second segment in accordance with the updated manifest file.

Likewise, the method of FIG. 10 represents an example of a method including sending data of a manifest file of multimedia content to a client device, wherein the manifest file includes information indicative of a first segment of a representation of the multimedia content, sending at least a portion of the first segment of the representation to the client device in response to a request from the client device, wherein the portion of the first segment indicates that the manifest file is to be updated, wherein an updated version of the manifest file includes information indicative of a second, different segment of the representation, and sending, in response to a request received from the client device and formed according to the updated manifest file, data of the second segment to the client device.

Figure 11:
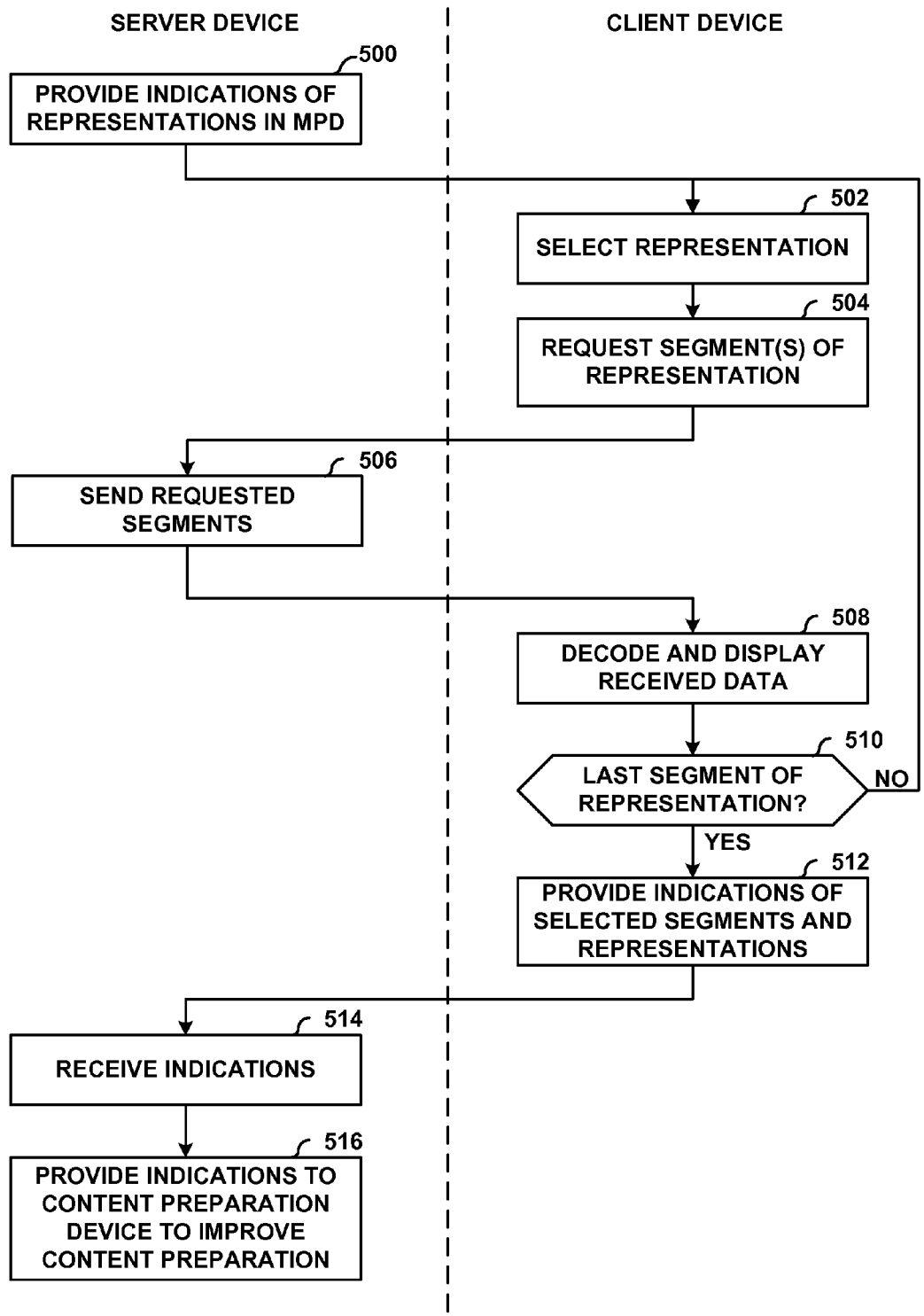
FIG. 11 is a flowchart illustrating an example method for constructing and using data of a quality of experience (QoE) report document.

FIG. 11 is a flowchart illustrating an example method for constructing and using data of a quality of experience (QoE) report document. Although the method of FIG. 11 is described with respect to server device 60 and client device 40, it should be understood that other devices may implement techniques similar to those of the method of FIG. 11. For example, content preparation device 20, or one or more network devices of a content delivery network, may perform some or all of the functions attributed to server device 60. Moreover, providing a QoE report to server device 60 and/or content preparation device 20 may be performed in conjunction with any or all of updating of an MPD, selection of a trick mode, and/or selection of a representation group and a representation from the representation group, as described with respect to FIGS. 8, 9, and 10 above.

Initially, server device 60 may provide indications of characteristics of representations of multimedia content in an MPD to client device 40 (500). As discussed above, client device 40 may select a representation (502), e.g., based on decoding and/or rendering capabilities of client device 40, user preferences, available network bandwidth, and/or other characteristics of representations of the multimedia content. Client device 40 may then request one or more segments of the selected representation (504).

Server device 60 may send the requested segments to client device 40 (506). After receiving the requested segments, client device 40 may decode and display the received data (508). Client device 40 may then determine whether all video data has been received (510). If the last segment of the representation (or multimedia content generally) has not been received ("NO" branch of 510), client device 40 may again evaluate a currently available amount of network bandwidth and select a representation based on this analysis (502) and request segments of the representation (504).

In general, client device 40 may buffer the data and attempt to avoid buffer over- and under-flow by requesting data of the multimedia content from a representation that can be accommodated by currently available network bandwidth. At times, however, buffer overflow or underflow may occur, e.g., if actual coding characteristics of the multimedia content did not match the signaled coding characteristics or if there was insufficient data for client device 40 to make a proper selection. Other factors may also result in reduced quality of experience for a user of client device 40. Therefore, after the last segment of the representation (or multimedia content) has been received and properly decoded ("YES" branch of 510), client device 40 may provide a quality of experience (QoE) report to server device 60.

For example, client device 40 may construct the report to include indications of selected segments and representations (512). Client device 40 may also record occurrences of buffer overflow/underflow, which may result in pauses in media playback. Client device 40 may form a report including a sequence of PeriodReport elements, representing the Periods that were played out. A Period element may include a sequence of RepresentationReport elements, each representing a continuous playout of a portion of a Representation, and providing the start and end tomes in both real time and presentation time. The report can also include the initial startup time, this being the time from the user request for viewing the content and the start of playout. In this manner, the report document may comprise an extensible markup language (XML) formatted electronic document indicative of representations of the multimedia content from which the client device retrieved media data of the multimedia content.

Client device 40 may provide the report to server device 60 or another device of a content delivery network, such as content preparation device 20 or a dedicated report collection device. In this manner, server device 60 may receive the indications of the segments and representations received by client device 40 (514). Server device 60 may then provide the indications to, e.g., content preparation device 20 or another device associated with a service provider or media assembler to improve content preparation (516). From the information provided by client device 40, a service provider may determine exactly what was played out, when there were pauses in playout, and when there were switches between representations. Alternatively or additionally, client device 40 may provide summary information in the form of the total playout duration and number of distinct, continuous playout periods for each representation, together with the number of pauses and the mean and variance of the pause durations.

Using this data, the service provider may analyze quality of experience information for a new piece of media content for streaming using Adaptive HTTP Streaming. The service provider may make a number of different representations at different bitrates available, and provide HTTP serving infrastructure to host the media files, then collect the feedback to determine quality of users' viewing experiences. The service provider may use this data to improve quality of service for this or future media content hosting. Quality of Experience metrics may refer to actual viewing as experienced by a user and may be independent of client algorithms used for scheduling of HTTP requests, representation selection decisions, and the like. In this manner, the service provider may obtain a relatively accurate portrayal of the quality of a user's viewing experience for a specific viewing session.

In this manner, the method of FIG. 11 represents an example of a method including constructing a document including information indicative of representations of multimedia content from which media data was retrieved, and sending the constructed document to a server from which the media data was retrieved. The method of FIG. 11 also represents an example of a method including receiving information indicative of data retrieved by a client device, comprising receiving an extensible markup language formatted electronic document including information indicative of representations of the multimedia content from which the client device retrieved media data of the multimedia content.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving multimedia data, the method comprising:
   analyzing, by a client device, at least a first portion of a manifest file for multimedia content, wherein the first portion of the manifest file includes information indicative of sets of representations of the multimedia content, information indicative of common characteristics for each of the sets of representations, and information indicative of a location of a second portion of the manifest file, wherein analyzing the at least first portion comprises determining the location of the second portion of the manifest file, wherein the manifest file is separate from the representations, and wherein the representations included in each of the sets of representations comprise switchable representations that are alternatives to each other and that each represent the same multimedia content;
   selecting, by the client device, one of the sets of representations based on the common characteristics for the one of the sets of representations such that the common characteristics correspond to configuration data of the client device;
   selecting, by the client device, one of the representations of the selected one of the sets of representations based on one or more coding characteristics of the one of the representations of the one of the sets;
   generating, by the client device, a request for a first set of multimedia data of the one of the representations based on the selection;
   retrieving, by the client device, at least the second portion of the manifest file from the location determined from the first portion of the manifest file;
   analyzing, by the client device, the at least second portion of the manifest file to determine a location of a second set of multimedia data; and
   retrieving, by the client device, at least a portion of the second set of multimedia data from the location determined from the second portion of the manifest file.

2. The method of claim 1, wherein the multimedia content corresponding to the manifest file comprises requested multimedia content, the method further comprising:
   prior to sending the request for the first set of multimedia data, sending user information including at least one of a user identifier, user preferences for advertisements, and user demographic information;
   wherein analyzing the at least first portion of the manifest file comprises selecting a representation of a remote period comprising targeted advertisement multimedia content from the manifest file received in response to the user information, wherein the representation of the remote period comprises the second set of multimedia data;
   wherein retrieving the at least portion of the second set of multimedia data comprises sending a request for the second set of multimedia data of the selected representation of the targeted advertisement multimedia content; and
   sending the request for the first set of multimedia data of the one of the representations of the requested multimedia content only after sending the request for the second set of multimedia data of the selected representation of the targeted advertisement multimedia content.

3. The method of claim 1, wherein the second portion of the manifest file comprises a different portion of the manifest file than the first portion, wherein the first set of multimedia data and the second set of multimedia data comprise the same set of multimedia data, and wherein analyzing the at least second portion of the manifest file comprises determining the location of the set of multimedia data of the one of the representations from the second portion of the manifest file.

4. The method of claim 3, wherein the second portion of the manifest file includes information indicative of coding characteristic for each of the representations in the one of the sets of representations, and wherein selecting the one of the representations comprises analyzing the second portion of the manifest file to determine the coding characteristics of the representations in the one of the sets.

5. The method of claim 3, further comprising:
determining bitrates for the representations in the one of the sets from information included in the second portion of the manifest file;
wherein selecting the one of the representations comprises:
determining an available amount of network bandwidth; and
selecting the one of the representations based on a comparison of the bitrates for the representations in the one of the sets and the available amount of network bandwidth.

6. The method of claim 5, further comprising:
after sending the request for the set of multimedia data of the one of the representations, determining that the available amount of network bandwidth has changed;
selecting a second, different representation of the one of the sets of representations based on a comparison of the bitrates for the representations in the one of the sets and the changed amount of network bandwidth; and
sending a second request for data of the selected second representation of the one of the sets of representations, wherein the second request specifies data of a temporal period of the multimedia content subsequent to a temporal period of the multimedia content for the data of the first request.

7. The method of claim 1, wherein the common characteristics for the set of representations include information indicative of a language for at least one of text in the set of representations and a language for audio data in the set of representations, and wherein selecting the one of the sets of representations comprises selecting the one of the sets of representations having at least one of a language for text and audio corresponding to a language indicated by the configuration data of the client device.

8. The method of claim 1, wherein the common characteristics for the set of representations include information indicative of a camera perspective of a scene for the set of representations, and wherein selecting the one of the sets of representations comprises selecting the one of the sets of representations having a camera perspective corresponding to a camera perspective indicated by the configuration data of the client device.

9. The method of claim 1, wherein the common characteristics for the set of representations include information indicative of a rating for the set of representations, wherein the rating describes content suitability for a particular audience, and wherein selecting the one of the sets of representations comprises selecting the one of the sets of representations having a rating corresponding to a rating indicated by the configuration data of the client device.

10. The method of claim 1, further comprising determining a profile to which the manifest file conforms and retrieving the manifest file based on the profile.

11. A client device for receiving information for multimedia data, the client device comprising one or more processors configured to:
analyze at least a first portion of a manifest file for multimedia content, wherein the portion of the manifest file includes information indicative of sets of representations of the multimedia content, information indicative of common characteristics for each of the sets of representations, and information indicative of the location of a second portion of the manifest file, wherein the manifest file is separate from the representations, and wherein the representations included in each of the sets of representations comprise switchable representations that are alternatives to each other and that each represent the same multimedia content,
determine a location of the second portion of the manifest file,
select one of the sets of representations based on the common characteristics for the one of the sets of representations such that the common characteristics correspond to configuration data of the client device,
select one of the representations of the selected one of the sets of representations based on one or more coding characteristics of the one of the representations of the one of the sets,
generate a request for data of the one of the representations based on the selection, retrieve at least the second portion of the manifest file from the location determined from the first portion of the manifest file,
analyze the at least second portion of the manifest file to determine a location of a second set of multimedia data, and
retrieve at least a portion of the second set of multimedia data from the location determined from the second portion of the manifest file.

12. The client device of claim 11, wherein the multimedia content corresponding to the first portion of the manifest file comprises requested multimedia content, and wherein the one or more processors are configured to, prior to sending the request for the first set of multimedia data, send user information including at least one of a user identifier, user preferences for advertisements, and user demographic information, wherein to analyze the at least first portion of the manifest file, the one or more processors are configured to select a representation of a remote period comprising targeted advertisement multimedia content from the manifest file received in response to the user information, wherein the representation of the remote period comprises the second set of multimedia data, wherein to retrieve the at least portion of the second set of multimedia data, the one or more processors are configured to send a request for the second set of multimedia data of the selected representation of the targeted advertisement multimedia content, and to send the request for the first set of multimedia data of the one of the representations of the requested multimedia content only after sending the request for the second set of multimedia data of the selected representation of the targeted advertisement multimedia content.

13. The client device of claim 11, wherein the second portion of the manifest file comprises a different portion of the manifest file than the first portion, wherein the first set of multimedia data and the second set of multimedia data comprise the same set of multimedia data, and wherein the one or more processors are configured to determine the location of the set of multimedia data of the one of the representations from the second portion of the manifest file.

14. The client device of claim 13, wherein the second portion of the manifest file includes information indicative of coding characteristic for each of the representations in the one of the sets of representations, and wherein to select the one of the representations, the one or more processors are configured to analyze the second portion of the manifest file to determine the coding characteristics of the representations in the one of the sets.

15. The client device of claim 11, wherein the common characteristics for the set of representations include at least one of information indicative of a language for at least one of text and audio in the set of representations, information indicative of a camera perspective of a scene for the set of representations, and information indicative of a rating for the set of representations, wherein the rating describes content suitability for a particular audience and wherein to select the one of the sets of representations, the one or more processors are configured to select the one of the sets of representations having at least one of a language for at least one of text and audio corresponding to a language indicated by the configuration data of the client device, a camera perspective corresponding to a camera perspective indicated by the configuration data of the client device, and a rating corresponding to a rating indicated by the configuration data of the client device.

16. The client device of claim 11, wherein the client device comprises at least one of:
   an integrated circuit;
   a microprocessor; and
   a wireless communication device that includes the one or more processors.

17. A computer program product comprising a non-transitory computer-readable medium having stored thereon instructions that, when executed, cause a processor of a client device for retrieving multimedia data to:
   analyze at least a first portion of a manifest file for multimedia content, wherein the portion of the manifest file includes information indicative of sets of representations of the multimedia content, information indicative of common characteristics for each of the sets of representations, and information indicative of a location of a second portion of the manifest file, wherein the instructions that cause the processor to analyze the at least first portion comprise instructions that cause the processor to determine the location of the second portion of the manifest file, wherein the manifest file is separate from the representations, and wherein the representations included in each of the sets of representations comprise switchable representations that are alternatives to each other and that each represent the same multimedia content;
   select one of the sets of representations based on the common characteristics for the one of the sets of representations such that the common characteristics correspond to configuration data of the client device;
   select one of the representations of the selected one of the sets of representations based on one or more coding characteristics of the one of the representations of the one of the sets;
   generate a request for a first set of multimedia data of the one of the representations based on the selection;
   retrieve at least the second portion of the manifest file from the location determined from the first portion of the manifest file;
   analyze the at least second portion of the manifest file to determine a location of a second set of multimedia data; and
   retrieve at least a portion of the second set of multimedia data from the location determined from the second portion of the manifest file.

18. The computer program product of claim 17, wherein the multimedia content corresponding to the first manifest file comprises requested multimedia content, further comprising instructions that cause the processor to:
   prior to sending the request for the first set of multimedia data, send user information including at least one of a user identifier, user preferences for advertisements, and user demographic information;
   wherein the instructions that cause the processor to analyze the at least first portion of the manifest file comprise instructions that cause the processor to select a representation of a remote period comprising targeted advertisement multimedia content from the manifest file received in response to the user information, wherein the representation of the remote period comprises the second set of multimedia data;
   wherein the instructions that cause the processor to retrieve the at least portion of the second set of multimedia data comprises instructions that cause the processor to send a request for the second set of multimedia data of the selected representation of the targeted advertisement multimedia content; and
   send the request for the first set of multimedia data of the one of the representations of the requested multimedia content only after sending the request for the second set of multimedia data of the selected representation of the targeted advertisement multimedia content.

19. The computer program product of claim 17, wherein the common characteristics for the set of representations include at least one of information indicative of a language for at least one of text and audio in the set of representations, information indicative of a camera perspective of a scene for the set of representations, and information indicative of a rating for the set of representations, wherein the rating describes content suitability for a particular audience, and wherein the instructions that cause the processor to select the one of the sets of representations comprise instructions that cause the processor to select the one of the sets of representations having at least one of a language for at least one of text and audio corresponding to a language indicated by the configuration data of the client device, a camera perspective corresponding to a camera perspective indicated by the configuration data of the client device, and a rating corresponding to a rating indicated by the configuration data of the client device.

20. A method of sending information for multimedia data, the method comprising:
   obtaining a set of representations of multimedia content having one or more common characteristics, wherein each of the representations in the set have individual coding characteristics separate from the common characteristics;
   obtaining a manifest file for the multimedia content, wherein the manifest file includes information indicative of the representations in the set, information indicative of the common characteristics for the set of representations, information indicative of the coding characteristics for each of the representations in the set, and information indicative of locations of a first set of multimedia data of at least one of the representations, and wherein the manifest file comprises a first portion and a second, different portion, wherein the first portion of the manifest file includes the information indicative of the representations in the set, the information indicative of the common characteristics, and information indicative of a location of the second portion of the manifest file, wherein the second portion includes information indicative of a location of a second set of multimedia data, wherein the manifest file is separate from the representations, and wherein the representations included in each of the sets of representations comprise switchable representations that are alternatives to each other and that each represent the same multimedia content; and sending at least the first portion and the second portion of the manifest file to a client device.

21. The method of claim 20, wherein the common characteristics for the set of representations include information indicative of at least one of a language for at least one of text and audio in the set of representations, a camera perspective of a scene for the set of representations, and a rating for the set of representations, wherein the rating describes content suitability for a particular audience.

22. The method of claim 20, further comprising:
receiving, from the client device, a request for the second portion of the manifest file;
sending the second portion of the manifest file to the client device in response to the request;
receiving, from the client device, a request for at least a portion of the second set of multimedia data from the location indicated by the second portion of the manifest file; and
sending, in response to the request for the portion of the second set of multimedia data, the requested portion of the second set of multimedia data to the client device.

23. The method of claim 22, wherein the multimedia content corresponding to the first portion of the manifest file comprises requested multimedia content, the method further comprising:
receiving, from the client device, user information including at least one of a user identifier, user preferences for advertisements, and user demographic information; and
selecting targeted advertisement multimedia data based on the received user information, wherein the selected targeted advertisement multimedia data is associated with the second portion of the manifest file.

24. The method of claim 22, wherein the second portion of the manifest file comprises a different portion of the manifest file than the first portion, and wherein the first set of multimedia data and the second set of multimedia data comprise the same set of multimedia data.

25. The method of claim 20, further comprising:
sending, before sending the at least first and second portions of the manifest file, information indicative of a profile to which the manifest file corresponds to the client device; and
receiving a request for the manifest file from the client device after sending the information indicative of the profile.

26. A device for sending information for multimedia data, the device comprising one or more processors configured to:
obtain a set of representations of multimedia content having one or more common characteristics, wherein each of the representations in the set have individual coding characteristics separate from the common characteristics,
obtain a manifest file for the multimedia content, wherein the manifest file includes information indicative of the representations in the set, information indicative of the common characteristics for the set of representations, information indicative of the coding characteristics for each of the representations in the set, and information indicative of locations of a first set of multimedia data of at least one of the representations, and wherein the manifest file comprises a first portion and a second, different portion, wherein the first portion of the manifest file includes the information indicative of the representations in the set, the information indicative of the common characteristics, and information indicative of a location of the second portion of the manifest file, wherein the second portion includes information indicative of a location of a second set of multimedia data, wherein the manifest file is separate from the representations, and wherein the representations included in each of the sets of representations comprise switchable representations that are alternatives to each other and that each represent the same multimedia content, and
send at least the first portion and the second portion of the manifest file to a client device.

27. The device of claim 26, wherein the common characteristics for the set of representations include information indicative of at least one of a language for at least one of text and audio in the set of representations, a camera perspective of a scene for the set of representations, and a rating for the set of representations, wherein the rating describes content suitability for a particular audience.

28. The device of claim 26, wherein the one or more processors are configured to receive, from the client device, a request for the second portion of the manifest file, send the second portion of the manifest file to the client device in response to the request, receive, from the client device, a request for at least a portion of the second set of multimedia data from the location indicated by the second portion of the manifest file, and send, in response to the request for the portion of the second set of multimedia data, the requested portion of the second set of multimedia data to the client device.

29. The device of claim 28, wherein the multimedia content corresponding to the first portion of the manifest file comprises requested multimedia content, and wherein the one or more processors are configured to receive, from the client device, user information including at least one of a user identifier, user preferences for advertisements, and user demographic information, and select targeted advertisement multimedia data based on the received user information, wherein the selected targeted advertisement multimedia data is associated with the second portion of the manifest file.

30. The device of claim 28, wherein the second portion of the manifest file comprises a different portion of the manifest file than the first portion, and wherein the first set of multimedia data and the second set of multimedia data comprise the same set of multimedia data.

31. The device of claim 26, wherein the one or more processors are configured to send, before sending the at least first and second portions of the manifest file, information indicative of a profile to which the manifest file corresponds to the client device, and receive a request for the manifest file from the client device after sending the information indicative of the profile.

32. The device of claim 26, wherein the device comprises at least one of:
an integrated circuit;
a microprocessor; and
a wireless communication device that includes the one or more processors.

33. A computer program product comprising a non-transitory computer-readable storage medium having stored thereon instructions that, when executed, cause a processor of a device for providing multimedia data to:
obtain a set of representations of multimedia content having one or more common characteristics, wherein each of the representations in the set have individual coding characteristics separate from the common characteristics;
obtain a manifest file for the multimedia content, wherein the manifest file includes information indicative of the representations in the set, information indicative of the common characteristics for the set of representations, information indicative of the coding characteristics for each of the representations in the set, and information indicative of locations of a first set of multimedia data of at least one of the representations, and wherein the manifest file comprises a first portion and a second, different portion, wherein the first portion of the manifest file includes the information indicative of the representations in the set, the information indicative of the common characteristics, and information indicative of a location of the second portion of the manifest file, wherein the second portion includes information indicative of a location of a second set of multimedia data, wherein the manifest file is separate from the representations, and wherein the representations included in each of the sets of representations comprise switchable representations that are alternatives to each other and that each represent the same multimedia content; and send at least the first portion and the second portion of the manifest file to a client device.

34. The computer program product of claim 33, wherein the common characteristics for the set of representations include information indicative of at least one of a language for at least one of text and audio in the set of representations, a camera perspective of a scene for the set of representations, and a rating for the set of representations, wherein the rating describes content suitability for a particular audience.

35. The computer program product of claim 33, further comprising instructions that cause the processor to:

receive, from the client device, a request for the second portion of the manifest file;

send the second portion of the manifest file to the client device in response to the request;

receive, from the client device, a request for at least a portion of the second set of multimedia data from the location indicated by the second portion of the manifest file; and send, in response to the request for the portion of the second set of multimedia data, the requested portion of the second set of multimedia data to the client device.

36. The computer program product of claim 35, wherein the multimedia content corresponding to the first portion of the manifest file comprises requested multimedia content, further comprising instructions that cause the processor to:

receive, from the client device, user information including at least one of a user identifier, user preferences for advertisements, and user demographic information; and select targeted advertisement multimedia data based on the received user information, wherein the selected targeted advertisement multimedia data is associated with the second portion of the manifest file.

37. The computer program product of claim 35, wherein the second portion of the manifest file comprises a different portion of the manifest file than the first portion, and wherein the first set of multimedia data and the second set of multimedia data comprise the same set of multimedia data.

38. The computer program product of claim 17, wherein the second portion of the manifest file comprises a different portion of the manifest file than the first portion, wherein the first set of multimedia data and the second set of multimedia data comprise the same set of multimedia data, and wherein the instructions that cause the processor to analyze the at least second portion of the manifest file comprises instructions that cause the processor to determine the location of the set of multimedia data of the one of the representations from the second portion of the manifest file.

* * * * *